US008291425B2

(12) United States Patent
Takashige et al.

(10) Patent No.: US 8,291,425 B2
(45) Date of Patent: Oct. 16, 2012

(54) COMPUTER, CONTROL METHOD FOR VIRTUAL DEVICE, AND PROGRAM THEREOF

(75) Inventors: Souichi Takashige, Hachiouji (JP); Naoki Utsunomiya, Machida (JP)

(73) Assignee: Hitachi, Ltd., Tokyo (JP)

( * ) Notice: Subject to any disclaimer, the term of this patent is extended or adjusted under 35 U.S.C. 154(b) by 1170 days.

(21) Appl. No.: 11/955,761

(22) Filed: Dec. 13, 2007

(65) Prior Publication Data

US 2008/0162800 A1 Jul. 3, 2008

(30) Foreign Application Priority Data

Dec. 13, 2006 (JP) .................. 2006-335803

(51) Int. Cl.
*G06F 9/46* (2006.01)
*G06F 3/00* (2006.01)

(52) U.S. Cl. .......................................... 718/104; 710/38

(58) Field of Classification Search .................. None
See application file for complete search history.

(56) References Cited

U.S. PATENT DOCUMENTS

| 4,887,202 A * | 12/1989 | Tanaka et al. ................. 703/21 |
| 6,125,411 A | 9/2000 | Sato |
| 6,725,289 B1 | 4/2004 | Waldspurger et al. |
| 7,546,398 B2 * | 6/2009 | Corneli et al. ................. 710/38 |
| 2004/0143664 A1 | 7/2004 | Usa et al. |
| 2005/0132365 A1* | 6/2005 | Madukkarumukumana et al. ................. 718/1 |

FOREIGN PATENT DOCUMENTS

| JP | 01-316833 | 12/1989 |
| JP | 2004-199561 | 7/2004 |
| WO | WO 97/10549 | 3/1997 |

* cited by examiner

*Primary Examiner* — Meng An
*Assistant Examiner* — Wissam Rashid
(74) *Attorney, Agent, or Firm* — Antonelli, Terry, Stout & Kraus, LLP.

(57) ABSTRACT

A computer in which functions of its resources are divided to realize a plurality of virtual computers 12 and which includes a plurality of physical devices. A managing unit of the computer, when usage of a virtual device has changed, selects a physical device compatible with the virtual device from physical devices usable for a control scheme and makes the physical device be associated with the virtual device and changes the control scheme of the virtual device, thereby achieving the control of devices in the virtual computers, where a plurality of control schemes including a shared scheme and a dedicated scheme are switched.

14 Claims, 18 Drawing Sheets

FIG.4

301(302) PHYSICAL NIC LIST (VIRTUAL NIC LIST)

| 401 MAC ADDRESS | 402 MODEL NAME | 403 DEVICE MOUNTED POSITION Bus/Dev/Func | 404 MMIO ADDRESS | 405 MMIO ADDRESS |
|---|---|---|---|---|
| xx:xx:xx:xx:xx:x1 | COMPANY A XX-XX | 0/0/0 | 0xqqqqqq | 0xXXX |
| xx:xx:xx:xx:xx:x2 | COMPANY A XX-XX | 0/1/0 | 0xqqqqqr | 0xXXY |
| xx:xx:xx:xx:xx:x3 | COMPANY A XX-XY | 0/2/0 | 0xqqqqqs | 0xXXZ |
| xx:xx:xx:xx:xx:x4 | COMPANY B ZZ-ZZ | 0/3/0 | 0xqqqqqt | 0xXXA |
| xx:xx:xx:xx:xx:x5 | COMPANY B ZZ-ZZ | 1/0/0 | 0xqqqqqu | 0xXXB |
| xx:xx:xx:xx:xx:x6 | COMPANY B ZZ-ZQ | 1/1/0 | 0xqqqqqv | 0xXXC |

FIG.5

303 PHYSICAL-VIRTUAL NIC MAPPING LIST

| 501 | 502 | 503 | 504 | 505 | 506 |
|---|---|---|---|---|---|
| VIRTUAL COMPUTER NUMBER | VIRTUAL NIC IDENTIFIER Bus/Dev/Func | REDUNDANCY CONFIGURATION | REDUNDANCY STATUS | PHYSICAL NIC IDENTIFIER Bus/Dev/Func | PHYSICAL NIC USING SCHEME |
| #1 | 0/0/0 | TEAM 1 | ACTIVE SYSTEM | 0/0/0 | DIRECT DEDICATED |
| #1 | 0/1/0 | TEAM 1 | STANDBY SYSTEM | 0/1/0 | SHARED |
| #2 | 0/0/0 | TEAM 2 | ACTIVE SYSTEM | 0/2/0 | DIRECT DEDICATED |
| #2 | 0/1/0 | TEAM 2 | STANDBY SYSTEM | 0/1/0 | SHARED |

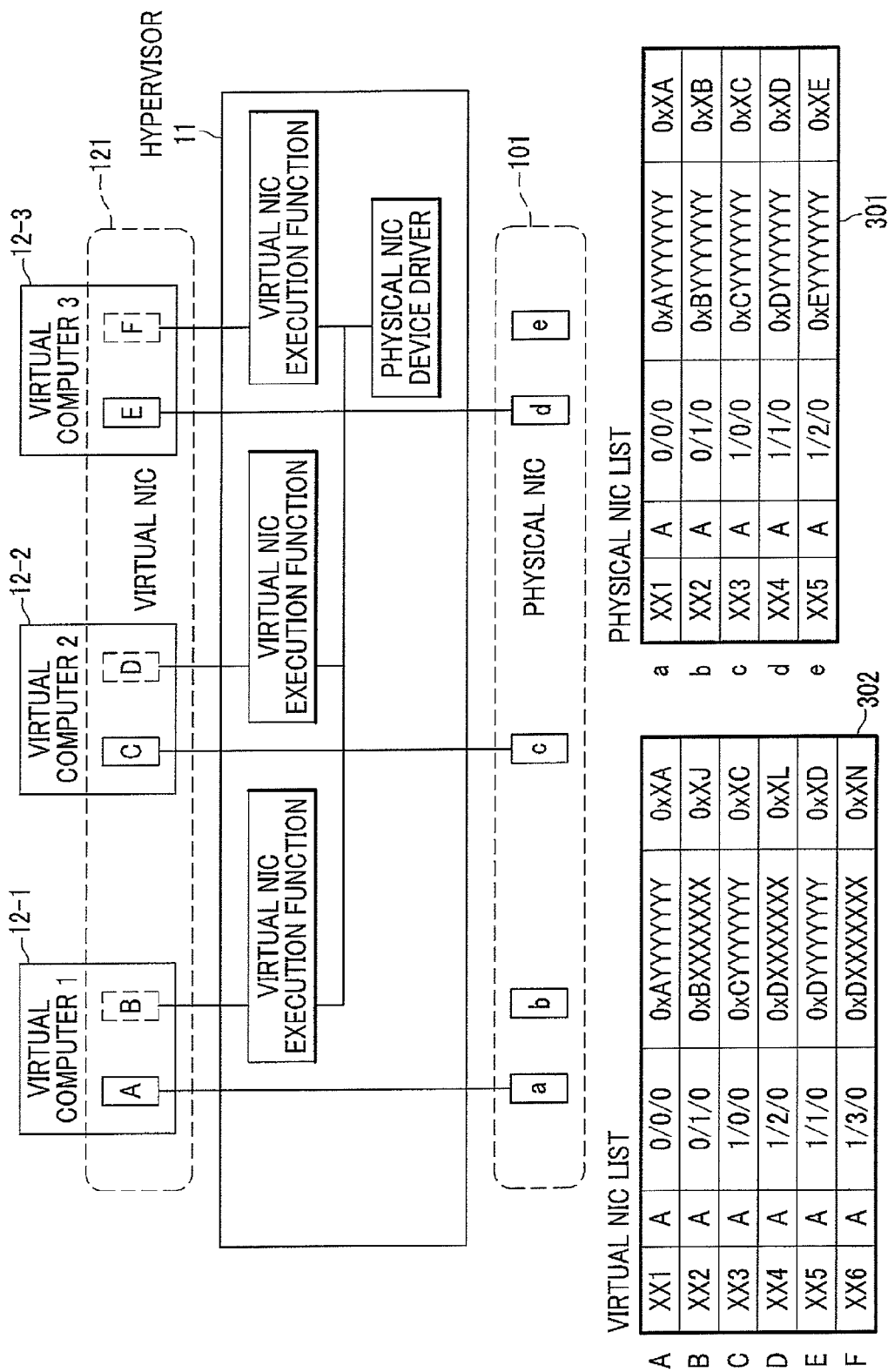

FIG.12

902 PROCESS SWITCHING POLICY

| TARGET STATUS | 1201 | TO-BE-CHECKED OBJECT 1202 | CHECK CONDITION 1203 | AFTER-POLICY-APPLICATION STATUS 1204 | AFTER-POLICY-APPLICATION PROCESSING SCHEME 1205 |
|---|---|---|---|---|---|
| STANDBY SYSTEM | INITIAL | COMMAND HISTORY | #1 MAC ADDRESS SETTING #2 CONFIGURE COMMAND | STANDBY SYSTEM | (A) SHARED |
| | | COMMAND STATISTICS | 10 PACKETS/SEC | ACTIVE SYSTEM | (C) DIRECT DEDICATED |

COMPUTER, CONTROL METHOD FOR VIRTUAL DEVICE, AND PROGRAM THEREOF

CROSS-REFERENCE TO RELATED APPLICATIONS

The present application claims priority from Japanese Patent Application No. 2006-335803 filed on Dec. 13, 2006, which is herein incorporated by reference.

BACKGROUND OF THE INVENTION

1. Field of the Invention

The present invention relates to the control and management of a virtual computer system.

2. Description of the Related Art

In these years, a technology is drawing attention where resources on a single computer are divided into multiple virtual computers and where a system comprising the multiple computers is integrated in a small number of physical computers. By reducing the number of physical computers, the reduction in power consumption and the simplification of management, thus, the reduction in operational costs can be achieved.

While the control technology for these virtual computers is drawing attention in these years because of advance in support techniques for constructing a virtual computer system using inexpensive computers of a PC (Personal Computer) architecture or the like, the control technology has been realized mainly in the control of main frames (general-purpose large-scale computers) or the like.

For such virtual computer systems, there are two schemes for controlling devices such as a network interface card (NIC) and a SCSI (Small Computer System Interface) card on computers. Hereinafter, devices actually mounted on computers are called physical devices, and devices recognized by virtual computers are called virtual devices.

A first one of the schemes is a scheme where a hypervisor that is the control unit (managing unit) of a virtual computer detects and analyzes control commands, issued to a virtual device from one or a number of virtual computers to emulate the operation of a physical device. With this scheme, overhead associated with the hypervisor is large and processing performance is degraded, while multiple virtual computers can share a single physical device. Further, where multiple virtual computers share a single physical device, there are the problems that it is difficult to secure processing performance, e.g., when multiple virtual computers use the physical device at the same time and that the performance prediction is difficult. Hereinafter, this first scheme is called a shared scheme.

A second scheme is a scheme where a hypervisor manages association between a particular physical device and a virtual computer and performs only the division of computer resources and where the virtual computer directly controls the physical device. Hereinafter, the second scheme is called a dedicated scheme. With the dedicated scheme, operation is at high speed, but physical devices cannot be shared.

Described in U.S. Pat. No. 4,887,202 (hereinafter called a reference 1) is a method that changes the scheme of controlling virtual devices from the shared scheme to the dedicated scheme, or from the dedicated scheme to the shared scheme in a virtual computer system having the two schemes.

Described in U.S. Pat. No. 6,725,289 (hereinafter called a reference 2) is a method that monitors the usage of virtual devices under the shared scheme and optimizes a page table of memory.

If in a practical system, all virtual devices are configured for the dedicated scheme, the number of physical devices that are to be mounted in computers increases. However, since there is a limit to the number of physical devices mountable in computers, it is difficult to configure all virtual devices in the dedicated scheme.

Accordingly, it is important to configure a system where the shared scheme and the dedicated scheme are mixed.

In some systems, depending on the usage of virtual devices, the shared scheme may be enough in performance, or the dedicated scheme may be needed in performance. Further, the usage of virtual devices may vary during operation. In particular, in order to secure stable processing performance in a system that varies in the usage, it is important to immediately change the scheme according to the usage.

Further, whether a virtual device operating under the shared scheme can be changed to operate under the dedicated scheme, or whether the opposite is possible depends on information about physical devices mounted in the system, the settings of virtual devices and the physical devices, and the like. For example, when a virtual device under the shared scheme is changed to operate under the dedicated scheme, in a general architecture such as PC/AT (Personal Computer/Advanced Technology), an identifier such as the mounted position of the virtual device needs to be the same.

Although reference 1 describes a method of changing the control scheme for virtual devices, because information about the system configuration and the usage of the virtual devices are not managed, time to change the control scheme and the control scheme to be used cannot be automatically determined. Hence, an instruction to change must be given externally.

Also in reference 2, the control scheme to be used cannot be automatically determined.

If a human manually performs that change, management cost will increase proportionally to the number of computers, thus resulting in large management cost. Moreover, if manual work time is necessary, the scheme in use cannot be switched quickly. Thus, degradation in performance for a long time may be caused. Hence, a method of changing the control scheme at high speed without manual intervention is needed.

Accordingly, a method of managing information about both the usage of virtual devices and the system configuration collectively and determining time to change the control scheme and the control scheme to be used is needed.

SUMMARY OF THE INVENTION

The present invention was made in view of the above problems, and an object thereof is to appropriately switch multiple control schemes including the shared scheme and the dedicated scheme as to the control of virtual devices in virtual computers.

The present invention is a computer in which functions of its resources including a processing unit and memory are divided to realize a plurality of virtual computers and which includes a plurality of physical devices that are peripheral connecting devices or network connecting devices.

The computer comprises a managing unit that comprises the processing unit and the memory, manages the plurality of virtual computers and the plurality of physical devices, assigns the virtual computers the physical devices as the virtual devices, and manages the virtual devices according to one of a plurality of control schemes including a dedicated scheme where a virtual device is associated with a physical device on a one-to-one basis and a shared scheme where a plurality of virtual devices are associated with one physical device.

The managing unit has status information holding use-status information indicating either an active status where the virtual device is in use or an inactive, status where the virtual device is hardly or not at all in use; configuration information holding information about configurations including respective address spaces of the physical devices and the virtual devices; and association information holding information about association between the physical devices and the virtual devices.

The managing unit refers to the status information and, when determining that usage of the virtual device has changed, referring to the configuration information, selects a physical device compatible with the virtual device from the physical devices usable for a control scheme based on at least one of a hardware specification, an identifier, and an address space, and makes the physical device be associated with the virtual device in the association information and changes the control scheme of the virtual device.

The other means will be described later.

BRIEF DESCRIPTION OF THE DRAWINGS

For a more complete understanding of the present invention and the advantages thereof, reference is now made to the following description taken in conjunction with the accompanying drawings wherein:

FIG. 4 shows an example configuration of a physical NIC list/virtual NIC list;

FIG. 5 shows an example configuration of a physical-virtual NIC mapping list;

FIG. 6 shows an example configuration of the virtual computer system;

FIG. 12 shows an example configuration of a process switching policy;

DETAILED DESCRIPTION OF THE INVENTION

The best mode for carrying out the invention (hereinafter called an embodiment) will be described below with reference to the drawings as needed. Here, as to the control of virtual devices in virtual computers, as a representative example where it is effective to change (switch) between the shared scheme and the dedicated scheme depending on the usage of virtual devices, a device redundancy technique for increasing the reliability of a computer will be described.

Although in this embodiment the term device refers to a SCSI card, an NIC, and an input/output apparatus, in other embodiments, it may refer to those and similar apparatuses (other peripheral connecting and network connecting apparatuses).

First, the premise and outline of this embodiment are as follows. In systems of business companies, usually multiple devices are mounted on a computer for redundancy in case a hardware failure occurs. As a redundancy scheme, there is a scheme where a device of an active system (or being active) and a device of a standby system (or being standby or inactive) are used.

In the above scheme, the same type of multiple devices that have the roles of the active system and the standby system are grouped into a set and treated virtually as one device.

In order to fulfill the function of the one device, the device having the role of the active system is usually used.

The device of the standby system is not used except when performing a small number of accesses in order to confirm that the device has not failed.

If the device of the active system has failed, the OS running on a virtual computer uses the device of the standby system as a replace device.

If all physical devices are used under the dedicated scheme, the number of the devices increases. In the above redundancy configuration, because processing performance is not required of devices of the standby system, the standby system uses devices under the shared scheme, thereby reducing the total number of physical devices. Meanwhile, in the active system, devices are assigned in a dedicated manner, thereby securing high speed, stable processing performance.

Further, in a computer system, a small number of spare devices are provided, and when a device of the standby system is used as a replace device for the active system, control software such as a hypervisor detects, a change in the usage of the device according to the control scheme of the virtual computer system of the present embodiment. Then, the control scheme for the virtual device is changed from the shared scheme to the dedicated scheme using the spare device. Thus, the control scheme for the device can be changed according to the usage. In other words, processing performance can be secured continuously in response to changes in the state of the system. These things will be described in detail below.

First Embodiment

Figure 1:
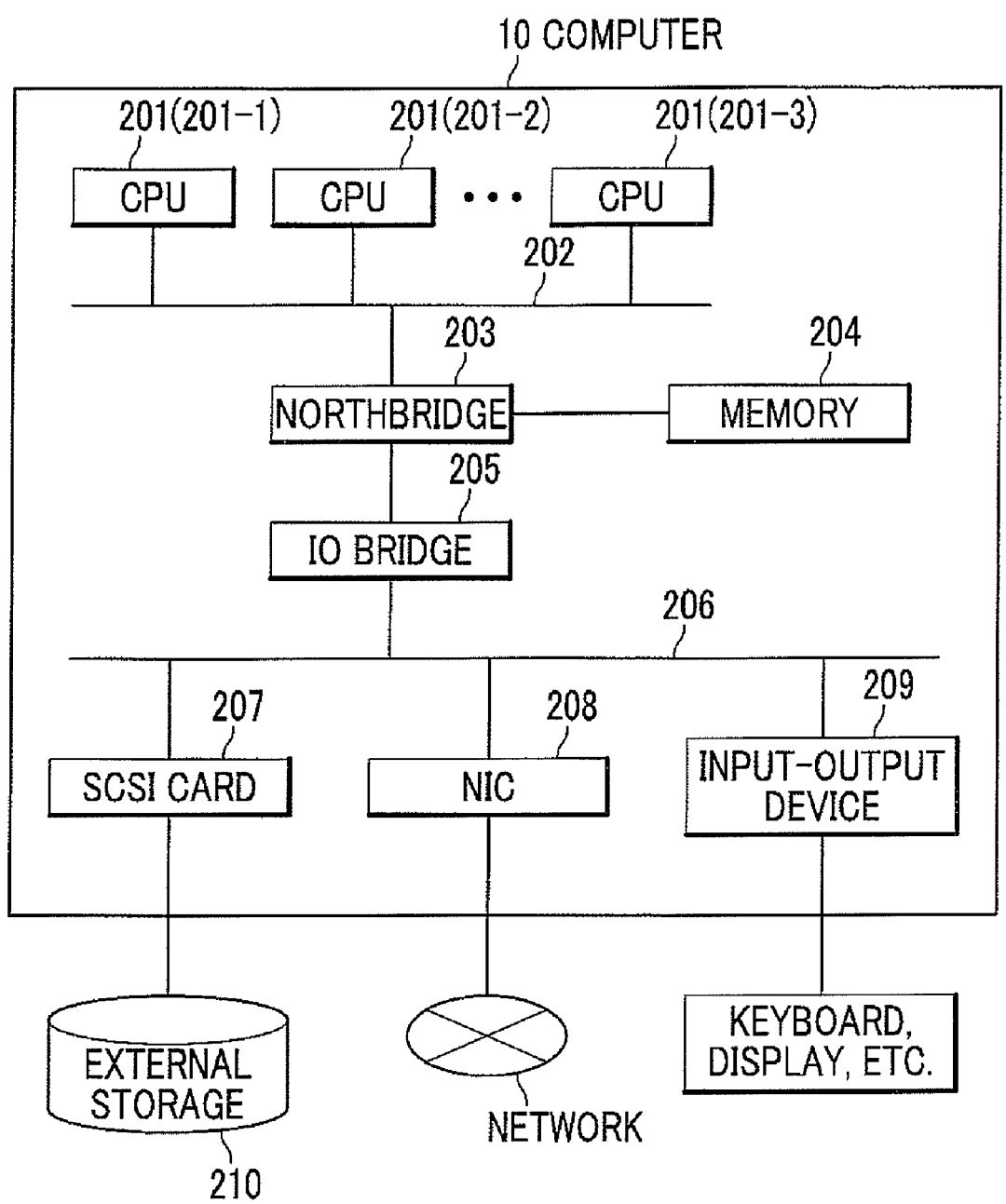
FIG. 1 is a configuration diagram showing a computer and others.

Firstly, a first embodiment will be described. An example of the configuration of a computer 10 that has a virtual computer system run thereon will be described with reference to FIG. 1. FIG. 1 is a configuration diagram showing the computer 10, etc.

The computer 10 comprises one or more CPUs (Central Processing Units) 201 (a collective number for 201-1 to 201-

3; hereinafter similar representation is used for other components) (processing units), which are connected to a northbridge 203 via a front side bus 202.

The northbridge 203 is connected to memory 204 (storage) and an IO (Input/Output) bridge 205 and controls data transfers between the CPU 201 and the memory 204 and between the memory 204 and the IO bridge 205. The northbridge 203 can be embodied by, e.g., an information communication controlling LSI (Large Scale Integration) chip.

The IO bridge 205 is an intermediary device and connected to one or more IO buses 206 such as a PCI (Peripheral Component Interconnect) bus and controls data transfers between IO devices connected to the IO buses 206 and the northbridge 203.

Here, examples of the IO devices are a SCSI card 207 (a peripheral) for connecting to an external storage 210, an NIC (Network Interface Card) 208 (a network connecting device) for connecting to a network and an input-output device 209 (a peripheral) for connecting to a keyboard, a display, and the like.

The CPU 201 reads a program stored on the memory 204 via the northbridge 203 and executes it, and according to the program, issues commands to the SCSI card 207, the NIC 208, and the like via the northbridge 203 and the IO bridge 205 to execute data transfer control.

The memory 204 and the IO devices as a whole (the SCSI card 207, the NIC 208, and the like) each have a unique address space (a memory area addressable) on the computer 10. The CPU 201 issues data transfer commands specifying the addresses of data transfer destinations. The memory 204 and the IO devices execute data transfer from or to the specified addresses.

Figure 2:
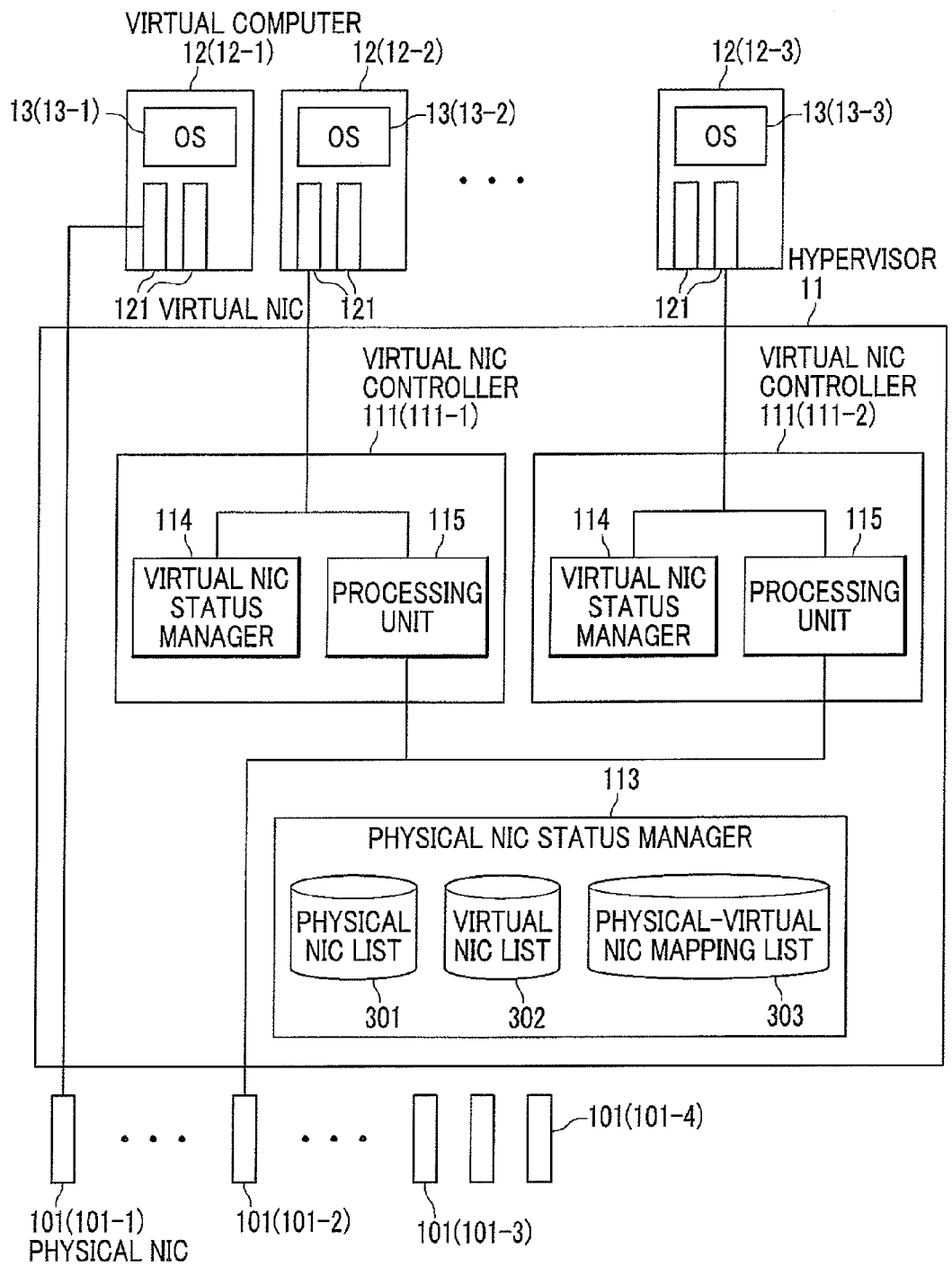
FIG. 2 is a configuration diagram of a virtual computer system.

Next, an example of the configuration of a virtual computer system that controls the computer 10 will be described with reference to FIG. 2. FIG. 2 is a configuration diagram of the virtual computer system.

A hypervisor 11 (a managing unit) is embodied as a program such as firmware or middleware that runs on the computer 10 (that is, realized by the CPU 201 and the memory 204) and manages the control of the computer 10 and the control of virtual computers 12 (12-1 to 12-3) and divides the resources of the single computer 10 so as to logically assign the divided resources to the multiple virtual computers 12. Since the hypervisor 11 is a program of a lower layer than an operating system (hereinafter called OS), at the start of the computer 10, after the execution of a system initializing program such as a BIOS (Basic Input/Output System), the hypervisor 11 is directly executed without the intervention of the OS.

Under the control of the hypervisor 11, one or more virtual computers 12 run on the computer 10. Each of the virtual computers 12 logically has the same configuration as shown in FIG. 1 but differs from the computer 10 of FIG. 1 all of whose functions are embodied by hardware in that all or part of the control is executed through the operation of the hypervisor 11, a program. On each virtual computer 12, one OS 13 (13-1 to 13-3) runs.

In the first embodiment, the redundancy of the NIC 208 as an example IO device will be described below using a PCI as an example of the IO bus 206.

The computer 10 has at least one physical NIC 101 (101-1 to 101-4, a similar representation to that of the NIC 208) as arm IO device. Herein, to distinguish from NICs 121 on the virtual computers 12, the NICs that the computer 10 has are called physical NICs.

Each virtual computer 12 has two or more virtual NICs 121. The OS 13 running on the virtual computer 12 uses the virtual NICs 121 for a redundancy configuration.

The hypervisor 11 has a function to assign a particular physical NIC 101 to a particular victual computer 12 in a dedicated manner. Where a physical NIC 101 is assigned to a particular virtual computer 12, the physical NIC 101 executes data transfer from and to only the virtual computer 12.

The hypervisor 11 has virtual NIC controllers 111 (111-1 to 111-2) and can implement the functions of the virtual NICs 121 on the virtual computers 12 with programs. The virtual NIC controllers 111 execute NIC control according to multiple schemes described later with reference to FIG. 6.

As to the virtual NIC controller 111, a processing unit 115 thereof refers to the redundancy status of the virtual NIC 121 and the system configuration of the virtual computer 12 and selects the control scheme for the virtual NIC 121. A virtual NIC status manager 114 thereof monitors the usage of the virtual NIC 121 and determines the redundancy status.

The details of the control scheme for data transfer commands using the physical NIC 101 will be described later.

A physical NIC status manager 113 manages the system configuration of each virtual computer 12. To be specific, it manages hardware (specification) configuration information of the physical NICs 101 which the computer 10 has, the system configurations of the virtual computers 12, and the assignment of the virtual NICs 121 on the virtual computers 12 and the physical NICs 101.

Next, the configuration managing method for the virtual computer 12 in the virtual computer system and an example of the system configuration of the virtual computer 12 will be described.

Figure 3:
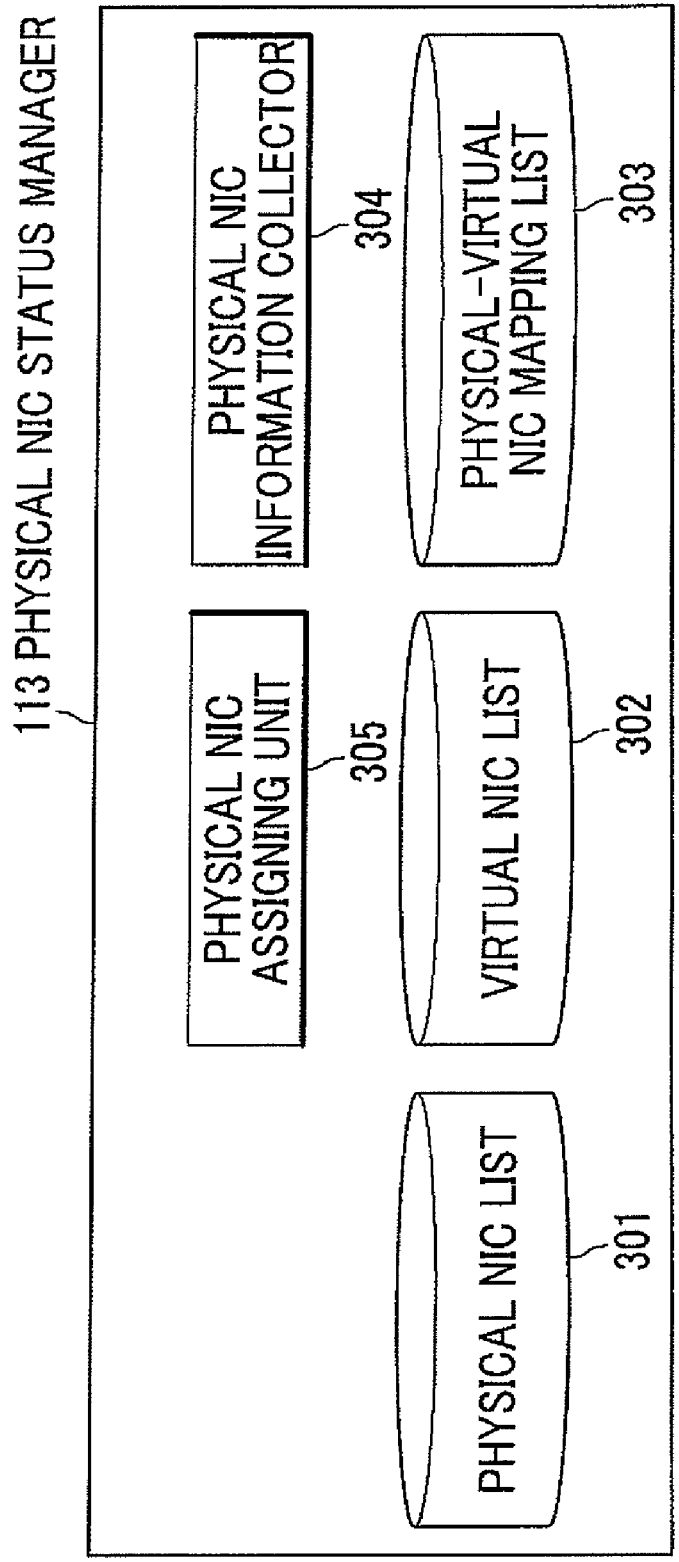
FIG. 3 shows an example of the configuration of a physical NIC status manager.

FIG. 3 shows an example of the configuration of the physical NIC status manager 113.

A physical NIC information collector 304 and a physical NIC assigning unit 305 are programs running on the hypervisor 11, and a physical NIC list 301 (configuration information), a virtual NIC list 302 (configuration information), and a physical-virtual NIC mapping list 303 (association information) are in a data store area secured in the memory 204 managed by the hypervisor 11.

The physical NIC information collector 304 is a function that collects, information about the hardware and software of the physical NICs 101 of the computer 10 and is embodied by a program running on the hypervisor 11 or the like.

The physical NIC information collector 304 is executed at the time that the hypervisor 11 starts on the computer 10 and collects configuration information via a configuration space assigned to the physical NICs 101 by the BIOS or the like to create the physical NIC list 301.

The physical NIC assigning unit 305 manages the association between the physical NICs 101 and the virtual NICs 121 on the virtual computers 12 and receives a request to associate a new virtual NIC 121 with a physical NIC 101 from another function (component) and assigns a physical NIC 101 that meets conditions.

The physical NIC list 301 is a list of information about the hardware and software of the physical NICs 101 and is held in the form of a table. The physical NIC information collector 304 collects information at the start of the computer 10 or the like and sets items in the physical NIC list 301.

An example configuration of the physical NIC list 301 will be described using FIG. 4. FIG. 4 shows an example configuration of the physical NIC list 301.

In the physical NIC list 301, a MAC (Media Access Control) address 401 of each physical NIC 101 is an identifier uniquely assigned to the physical NIC 101 and held in a memory area of the physical NIC 101.

A device mounted position 403 is an identifier indicating the position on a bus such as a PCI and determined by the position where the physical NIC 101 is mounted on the computer 10. In the PCI, the device mounted position 403 is used as an address when issuing commands to obtain and set basic information of the device.

A model name 402 is an identifier specifying the specification of the physical NIC 101, and the command specification used when the OS accesses is determined according to the model name 402.

An MMIO address 404 and an IO address 405 are addresses used to control the physical NIC 101, and data transfer from and to the physical NIC 301 is controlled by specifying these addresses. Usually, at the start of the computer 10, a system initializing program such as a BIOS determines these addresses.

A virtual NIC list 302 holds a list of information about the virtual NICs on the virtual computers, and since the table items of the virtual NIC list 302 are the same as in the physical NIC list 301, a duplicate description thereof is omitted.

However, the contents of the items are not collected by the physical NIC information collector 304 like the physical NIC list 301, but their values are determined by the hypervisor 11 when the virtual computer 12 is defined or at the start of the virtual computer 12 and updated directly by the hypervisor 11.

The method of determining the MAC address 401 is to use, e.g., a known technique which randomly selects an address of a specific address space assigned beforehand to the hypervisor 11, and in determining various addresses, addresses unique on the virtual computer 12 can be assigned by using the same method as the determining method by a BIOS of PC/AT compatibles. The detailed description of the above methods is omitted.

The addresses of the MMIO address 404 and the IO address 405 are assigned preferably unique not only on the virtual computer 12 but also among all the physical NICs 101 on the computer 10 by referring to the address values in the virtual NIC list 302 and the physical NIC list 301.

The physical-virtual NIC mapping list 303 is a list of information about the association between the virtual NICs 121 on the virtual computers 12 running on the computer 10 and the physical NICs 101 and held in the form of a table.

An example of the configuration of the physical-virtual NIC mapping list 303 will be described using FIG. 5. FIG. 5 shows an example configuration of the physical-virtual NIC mapping list 303.

A virtual computer number 501 is an identifier uniquely identifying a virtual computer 12. A virtual NIC identifier 502 is an identifier uniquely identifying a virtual NIC 121 on the virtual computer 12, and, for example, the device mounted position 403 in the virtual NIC list 302 is used.

A redundancy configuration 503 and a redundancy status 504 (status information) hold the statuses when the OS 13 on the virtual computer 12 is using virtual NICs 121 in a redundancy configuration. The redundancy configuration 503 holds a team name to team the virtual NICs 121 on the virtual computer 12. The redundancy status 504 indicates whether the virtual NIC 121 is of the active system or the standby system. The method of entering and updating the item values for the redundancy configuration 503 and the redundancy status 504 will be described later in a description of the control-managing method for the control scheme of the virtual NIC 121 by the hypervisor 11.

In the present embodiment, status representations based on the premise of a redundancy configuration are used, but not being limited to these, other status representations or more versatile ones such as access frequency may be used.

A physical NIC identifier 505 is an identifier uniquely identifying a physical NIC 101 associated with a virtual NIC 121 identified by the virtual computer number 501 and the virtual NIC identifier 502, and, e.g., information of the device mounted position 403 in the physical NIC list 301 is used.

A physical NIC using scheme 506 specifies a scheme for controlling commands issued from the OS 13 on the virtual computer 12 to a virtual NIC 121 by the hypervisor 11. Examples of the control scheme are shown by A, B, C, etc., of FIG. 6, the details of which will be described later.

Figure 13:
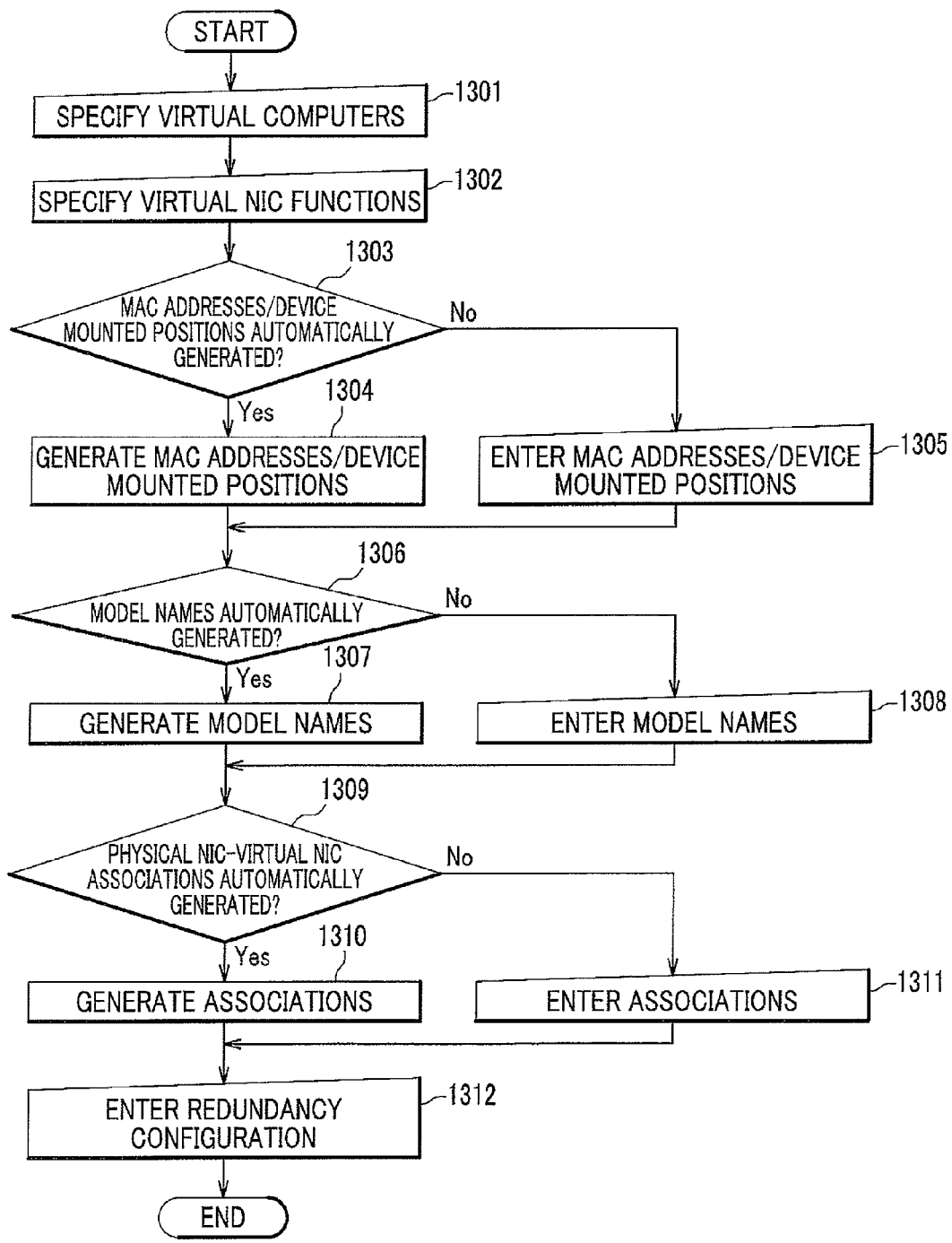
FIG. 13 is a flow chart showing the procedure of entering configuration information of a virtual computer.

Information about the redundancy configuration is entered by an administrator of the virtual computer system, according to an input method described later using FIG. 13.

FIG. 6 shows an example configuration of the viral computer system. A "virtual NIC execution function" in the hypervisor 11 indicates the virtual NIC controller 111 of FIG. 2.

As shown in FIG. 6, in this example configuration, three virtual computers 12-1 to 12-3 are operating and each have two virtual NICs 121 ("A" to "F"; hereinafter also called a virtual NIC "A" or simply "A", this applies to physical NICs 101 as well). Physical NICs 101 indicated by "a" to "e" are mounted on the computer 10.

On each virtual computer 12, a pair of two virtual NICs 121 constitutes a redundancy configuration of the active and standby systems. Here, "A", "C", "E" operate as the active system and "B", "D", "F" operate as the standby system. In usual network traffic, only the virtual NICs 121 of the active system are used for transmission. The virtual NICs 121 of the standby system do not transmit data at all, or they periodically transmit data for communication confirmation by the OS 13 on the virtual computer 12.

When each individual OS 13 detects a failure in its virtual NIC 121 "A", "C", or "E", the OS 13 makes a change so as to transmit data using the paired virtual NIC 121 "B", "D", or "F".

The physical NICs 101 "a", "c", "d" are assigned respectively to the virtual NICs 121 "A", "C", "E" of the active system. The physical NIC 101 "e" is assigned to the virtual NICs 121 "B", "D", "F" of the standby system and shared under a shared scheme of FIG. 8A described later.

Information about the redundancy configuration of the virtual NICs 121 and the association between the virtual NICs 121 and the physical NICs 101 is recorded in the physical-virtual NIC mapping list 303.

Since the physical NIC 101 "b" is assigned to no virtual NIC 121, when a failure occurs in the system and the OS 13 starts transmitting data using the virtual NIC 121 "B", "D", or "F" of the standby system, the physical NIC 101 "b" can be assigned in a dedicated manner to the virtual NIC 121.

Next, an example of the execution method of the control by the hypervisor 11 when the virtual computer 12 executes a data transfer command will be described with reference to FIGS. 7 and 8.

Figure 7:
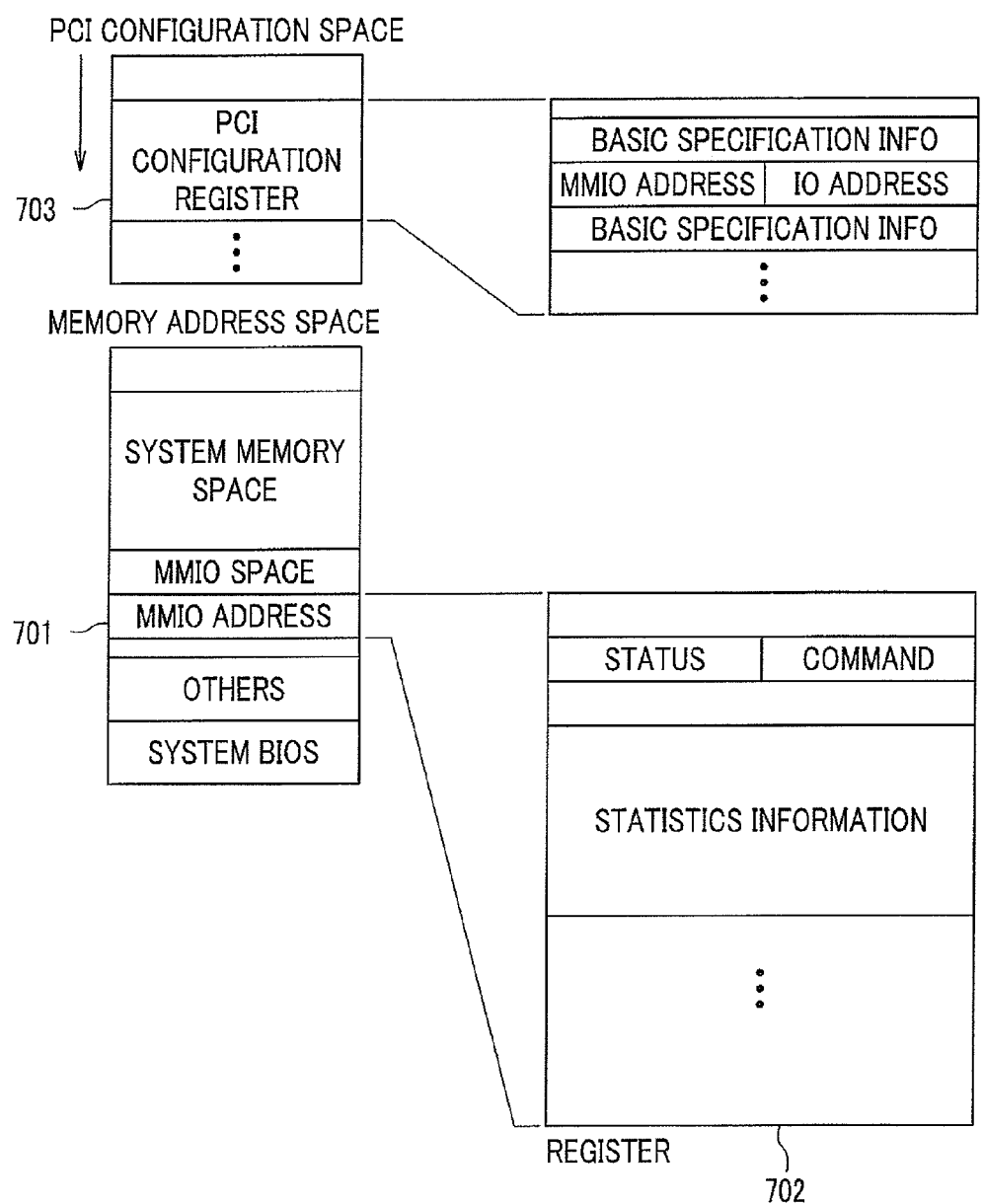
FIG. 7 shows an example of an access interface to an NIC.
Figure 8:
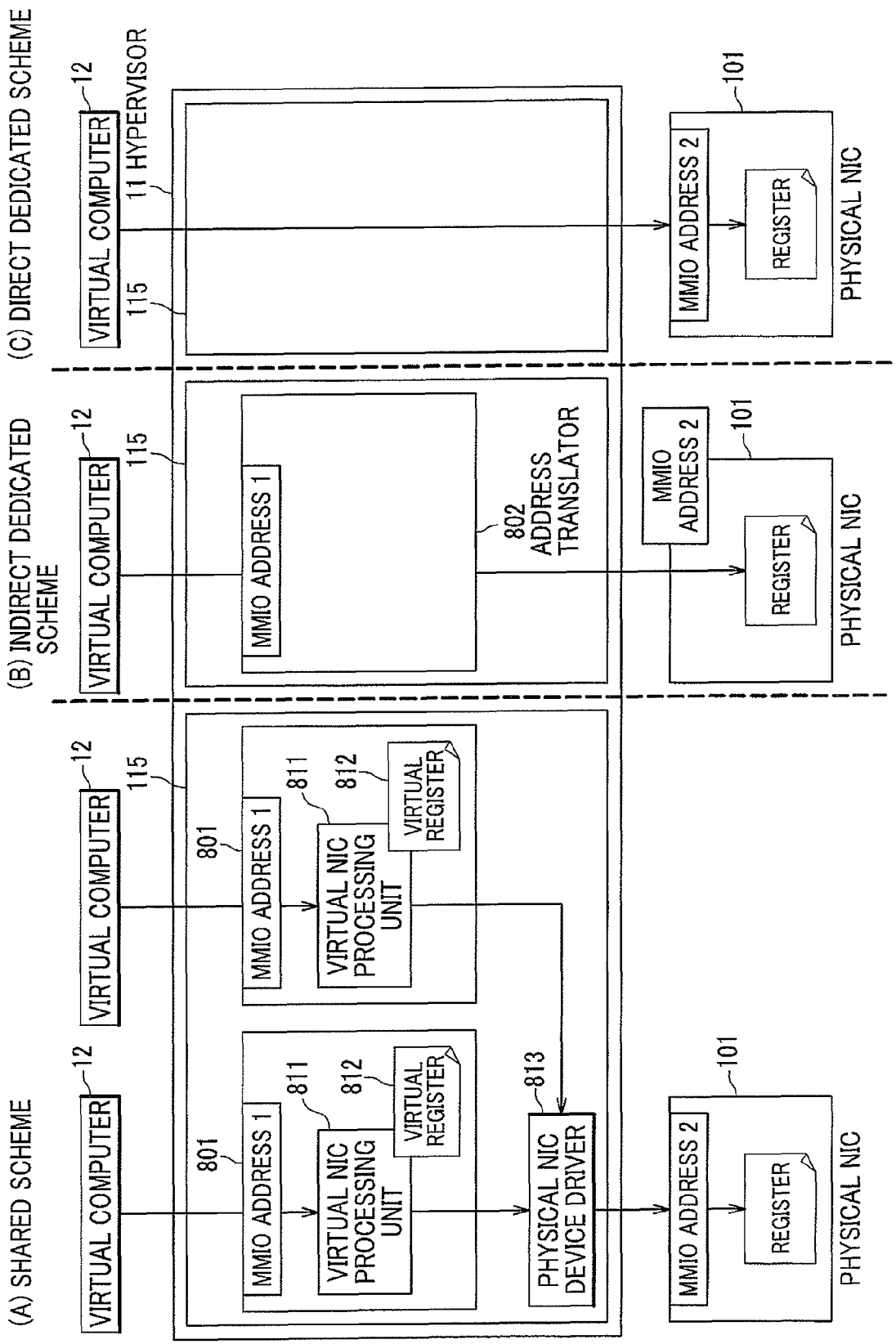
FIG. 8 shows examples of the configuration of a processing unit of a virtual NIC controller.

FIG. 7 shows the control method for an NIC (NIC 101 and virtual NIC 121) in the case of using memory mapped IO (hereinafter called MMIO) in order to access the NIC 208 on the usual computer 10.

In the access method by the MMIO in the computer 10, by writing data as a command into an MMIO address 701 in the address space of the memory 204 of the computer 10, the OS 13 can access a control register 702 of the NIC, thereby controlling the NIC. An individual MMIO address 701 is assigned to each device by, e.g., the BIOS initializing the system at the start of the computer 10.

The MMIO address 701 of each NIC takes on a value held in a PCI configuration register 703 in another address space called a PCI configuration space of the memory 204. When changing the MMIO address 701, the value in the PCI configuration register 703 is changed. For the physical NIC 101, the value in the register needs to be unique on the computer 10, and for the virtual NIC 121, it needs to be unique on the virtual computer 12.

As to the MMIO control method, an example configuration of the hypervisor 11 controlling the MMIO access in the virtual computer 12 will be described using FIGS. 8A to 8C. The processing unit 115 of the hypervisor 11 shown in FIG. 2 implements each of the processing schemes A to C below.

The processing unit 115 of FIG. 2 refers to the physical NIC using scheme 506 in the physical-virtual NIC mapping list 303 corresponding to a virtual NIC 121 to determine the processing scheme and selects and executes the specified processing scheme A to C, which are as follows.

FIG. 8A shows an example configuration of the processing unit 115 in the case where a plurality of NIC functions on the virtual computer 12 share a single physical NIC 101. Hereinafter, the scheme of FIG. 8A is called a shared scheme.

A virtual NIC emulating unit 801 comprises a virtual NIC processing unit 811 and a virtual register 812 (a hardware-specification specified number of virtual configuration registers and virtual registers). The processing unit 115 comprises a physical NIC device driver 813 that is control software for the virtual NIC 121, as well as the virtual NIC emulating unit 801.

The virtual NIC processing unit 811 and the physical NIC device driver 813 are programs running on the hypervisor 11. The virtual register 812 is a data store area secured in an area in the memory 204 managed by the hypervisor 11.

The virtual NIC processing unit 811 and the virtual register 812 each exist one for each virtual NIC of the virtual computer 12.

The physical NIC device driver 813 exists one for each physical NIC 101 and controls the physical NIC 101 like a usual OS device driver does.

In FIG. 8A, a unique MMIO address 1 in the virtual computer 12 is assigned to each NIC function of the virtual computer 12. The MMIO address 1 may be the same between the multiple virtual computers 12 on the computer 10. The OS on the virtual computer 12 issues an IO device control command specifying the MMIO address 1 in the memory space.

When detecting access to the MMIO address 1 on the virtual computer 12, the hypervisor 11 starts emulating the virtual NIC 121. The virtual NIC processing unit 811 of the virtual NIC emulating unit 801 reads the content of the access to the MMIO address 1 and executes a program for emulating the data transfer and hardware setting by the physical NIC 101 and stores results of the transfer and setting in the virtual register 812 as needed.

An interrupt caused by the physical NIC 101 is trapped by the physical NIC device driver 813 and converted into an interrupt on the virtual computer 12 to be transmitted to the virtual computer 12.

Because in the scheme of FIG. 8A, the hypervisor 11 intervenes and the processes that are otherwise performed by the physical NIC 101 are emulated by a program, operation speed is low. However, a plurality of virtual NIC emulating units 801 can share one physical NIC 101 because the physical NIC device driver 813 can convert data transfer requests received from a plurality of virtual NIC processing units 811 into data transfer requests to the physical NIC 101 with consistency.

Further, even if the virtual NIC 121 on the virtual computer 12 and the physical NIC 101 have different command specifications, because of acting as an intermediary, the physical NIC device driver 813 can cover the difference and thus flexibly deal with it.

FIGS. 8B and 8C show example configurations of the processing unit 115 in the case where a particular physical NIC 101 is assigned to the virtual NIC 121 on the virtual computer 12 on a one-to-one basis and the single physical NIC 101 executes data transfer for the single virtual NIC 121.

The scheme of FIG. 8B is used in the case where the address spaces of the virtual NIC 121 and of the physical NIC 101 cannot be made identical, or where no hardware exists which supports in translating an address on the virtual computer 12, used when an IO device accesses memory into a real address on the computer 1, among others. Hereinafter, the scheme of FIG. 8B is called an indirect dedicated scheme.

An example of hardware to translate an address can be hardware in compliance with the "Virtualization Technology for Directed I/O" specification proposed by Intel (registered trademark), but if such hardware is not available, the indirect dedicated scheme is used to make a device (physical NIC 101) operate under a dedicated scheme.

In FIG. 8B, there is one address translator 802 for each virtual NIC 121 on the hypervisor 11. The address translator 802 holds information about an MMIO address 2 of the physical NIC 101 associated therewith.

The OS 13 on the virtual computer 12 issues an IO device control command specifying the MMIO address 1 in the memory space.

When detecting access to the MMIO address 1 on the virtual computer 12, the hypervisor 11 performs the control of the virtual NIC 121. The address translator 802 reads the content of the access to the MMIO address 1 and executes memory access having the same content to the MMIO address 2. Here, the address translator 802 translates the address contained in the read data transfer request as needed, but need not make a change or an analysis other than that.

The hypervisor 11 traps interrupts caused by the physical NIC 101 and translates the device identifier into a device identifier on the virtual computer 12 as needed and transmits the translated interrupts to the virtual computer 12.

FIG. 8C shows an example configuration of the hypervisor 11 in the case where the same conditions as in FIG. 8B are true and in addition the MMIO address 1 on the virtual computer 12 and the MMIO address 2 which the physical NIC 101 has are identical. Hereinafter, the scheme of FIG. 8C is called a direct dedicated scheme.

In FIG. 8C, the OS 13 on the virtual computer 12 issues an IO device control command specifying the MMIO address 2 in the memory space.

The data transfer request to the NIC is directly transmitted from the OS 13 to the physical NIC 101.

The hypervisor 11 does not need to translate an address at all and does not detect access to the MMIO address 2.

As to interrupts caused by the physical NIC 101, the same method as in FIG. 8B may be used, and if the CPU 201 is assigned to the virtual computer 12 on a one-to-one basis, a method which directly transmits the interrupts to the virtual computer 12 without the hypervisor 11 trapping them may be used as well.

The premise for applying the direct dedicated scheme is the computer 10 having hardware which supports in translating an address on the virtual computer 12 used when an IO device accesses memory into a real address on the computer 10.

The dedicated schemes (B and C) can process at higher speed than the shared scheme A. In particular, the scheme C processes at high speed without overhead associated with the program. However, the scheme B requires that the command specifications of the virtual NIC 121 and the physical NIC 101 be the same, and it is not possible that a plurality of virtual NICs 121 share the physical NIC 101. Further, the scheme C requires that the identifiers of the virtual NIC 121 and the physical NIC 101 such as the device mounted positions match and that addresses such as the MMIO addresses 404 be unique among the addresses of all the physical NICs 101 of the computer 10, which limits the configuration that it is applicable to.

In summary, with the scheme A, because the hypervisor 11 needs to operate a program in order for the virtual computer 12 to access the physical NIC 101, overhead occurs resulting in slow processing speed, but a plurality of virtual NICs 121 can be associated with one physical NIC 101.

With the scheme B, because the hypervisor 11 need only translate an address in order for the virtual computer 12 to access the physical NIC 101, processing speed is in the middle among these three schemes.

With the scheme C, because the hypervisor 11 does not need to translate an address in order for the virtual computer 12 to access the physical NIC 101, processing speed is fast, but there is a limitation on the configuration of the address space and the like.

That is, there is a tradeoff between the flexibility of the configuration and operation (processing) speed with each scheme.

Although in the present embodiment access by means of the MMIO is used to access the virtual NIC 121, another interface may be used such as access through an IO port.

Next, the method of the hypervisor 11 to manage the status of the virtual NIC 121 will be described with reference to FIGS. 9 to 12.

Figure 9:
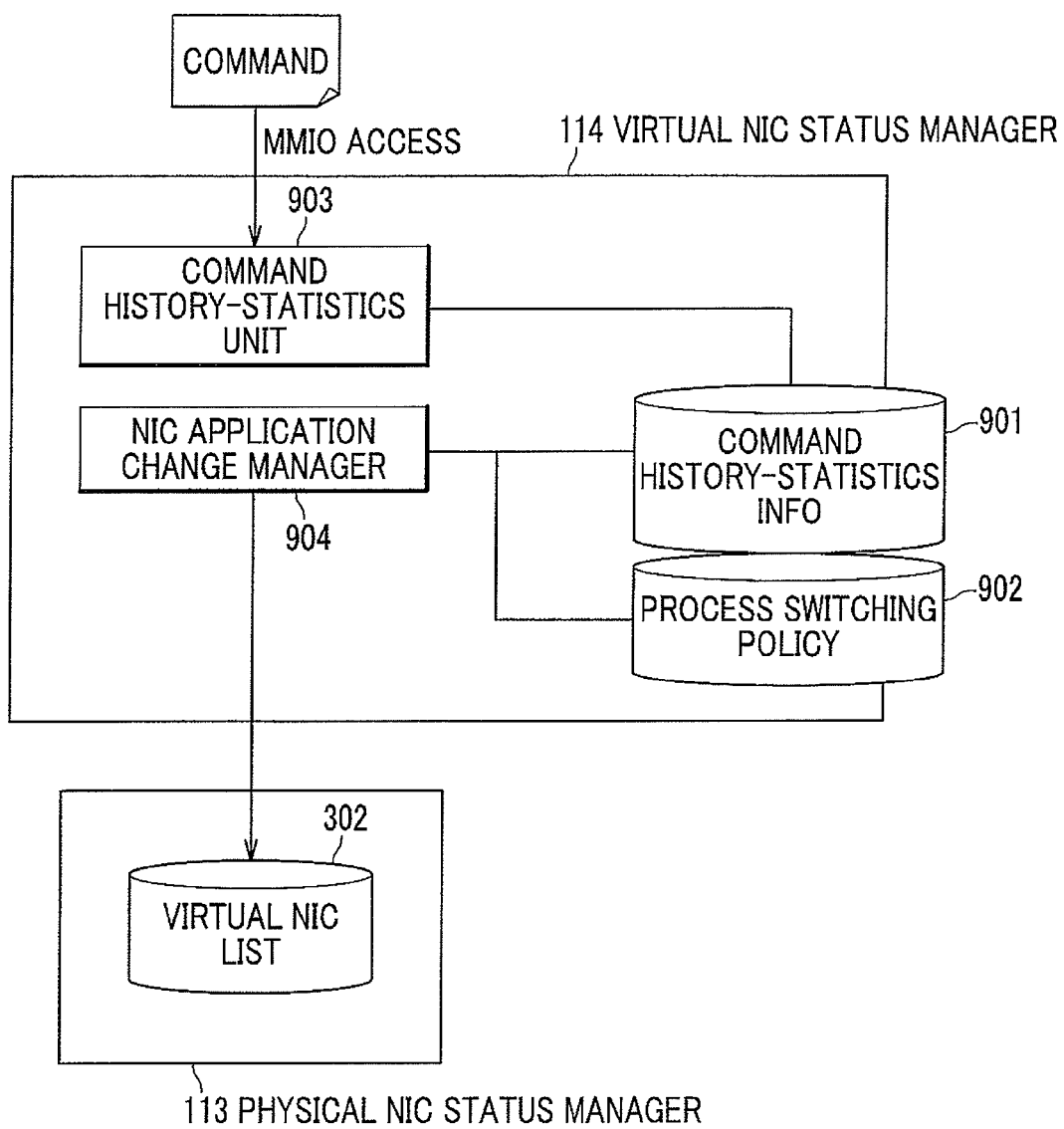
FIG. 9 shows an example configuration and the like of a virtual NIC status manager.

FIG. 9 shows an example configuration of a virtual NIC status manager 114 that manages the status of the virtual NIC 121, and the like.

Command history-statistics information 901 and process switching policy 902 (check condition information) are data store areas secured in the memory 204 managed by the hypervisor 11, and each is created one for each viral NIC 121.

Figure 10:
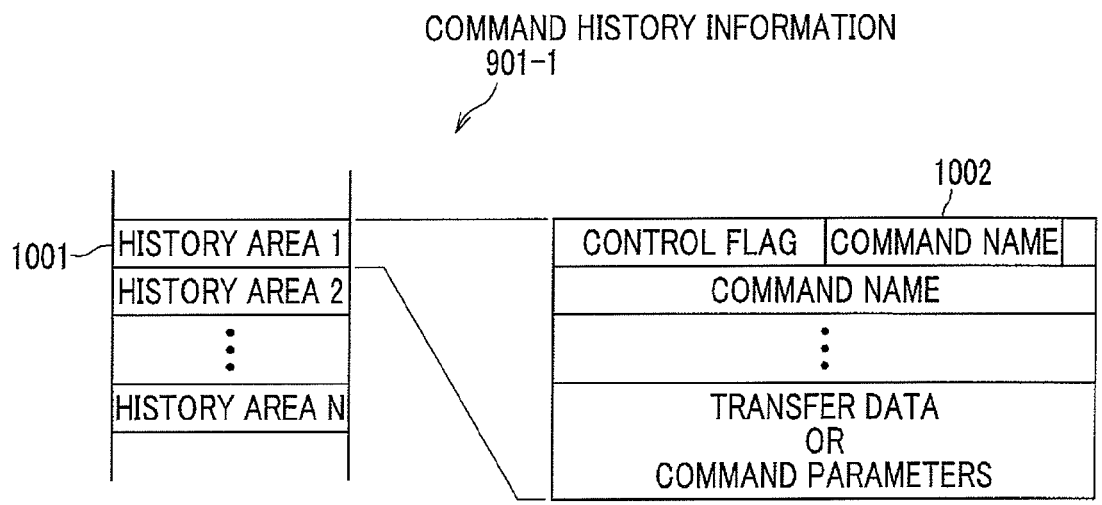
FIG. 10 shows an example configuration of command history information.
Figure 11:
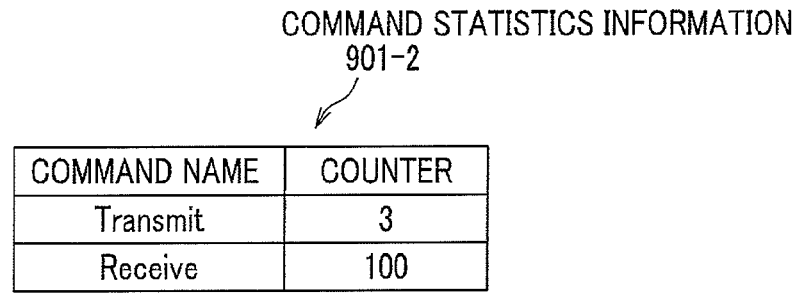
FIG. 11 shows an example configuration of command statistics information.

The command history-statistics information 901 holds history information of commands executed by the virtual NIC 121 and statistics information and comprises command history information 901-1 shown in FIG. 10 and command statistics information 901-2 shown in FIG. 11.

FIG. 10 shows an example of the commands of the NIC. The commands are stored as data in the memory 204.

Among the commands are commands to initialize and update the settings of the NIC such as address settings and commands to transmit and receive actual data.

Commands to the virtual NIC 121 are issued by the OS 13 on the computer 10 through MMIO access or the like. In the shared scheme A, the hypervisor 11 reads the content of the command.

A command history-statistics unit 903 analyzes the command name 1002 of the command read by the hypervisor 11 to determine which recording process to do.

If the command is a command to change the settings of the NIC, a data string read as the command is copied, as it is, into a history area 1001 of the command history-statistics information 901.

If the command is a command to transmit or receive, the command history-statistics unit 903 increments a statistics information counter (use frequency). The counter comprises a command name and the number of execution times as shown in FIG. 11.

The counter is cleared in a predetermined time. By this means, the number of command execution times per unit time is recorded.

In the indirect dedicated scheme and the direct dedicated scheme, the command history-statistics information 901 may not be collected. If these schemes are used, it may be that the information 901 cannot be used as a to-be-checked object 1202, described later, of the process switching policy 902.

The process switching policy 902 includes conditions on which to change the process that the virtual NIC 121 executes and rules specifying the content of the change and is stored as a data string or the like in an area of the memory 204 managed by the hypervisor 11.

The process switching policy 902 may be specified, for example, in a fixed manner by implementing the virtual computer system, or by the administrator of the virtual computer system (hereinafter simply called an administrator) entering through a user interface such as a GUI (Graphical User Interface) or a command line.

FIG. 12 shows an example configuration of the process switching policy 902.

The process switching policy 902 includes one target status 1201, one or more sets of a to-be-checked object 1202 and a check condition 1203, one after-policy-application status 1204, and one after-policy-application processing scheme 1205.

The target status 1201, the to-be-checked object 1202, and the check condition 1203 are conditions on which to apply this policy. The after-policy-application status 1204 indicates a redundancy status 504 of the virtual NIC 121.

The to-be-checked object 1202 indicates management information to be referenced to determine whether to carry out this policy, which information is, for example, command history information 901-1, command statistics information 901-2, the device mounted position 403 or the MMIO address 404 of the virtual NIC list 302, or the like.

Examples of the check condition 1203 respectively for the types of the to-be-checked object 1202 are as follow.

(1) Command History Information

The types of commands in the command history information 901-1 (the types of command names 1002 in FIG. 10) are referenced. A series of multiple command types is compared to a series of command types written in the check condition 1203, and if they match, it is determined that the check condition 1203 is met.

(2) Command Statistics Information

The counter of the command statistics information 901-2 of FIG. 11 is compared to the value of the check condition 1203, and if it exceeds a threshold, or if it is less than the threshold, it is determined that the check condition 1203 is met.

(3) Device Mounted Position/MMIO Address

For example, the device mounted position 403 or the HMO address 404 is unique on the computer 10. If true, it is determined that the check condition is met.

The after-policy-application status 1204 and the after-policy-application processing scheme 1205 indicate the status and the processing scheme after the policy is applied respectively. The after-policy-application status 1204 is set at the value of the redundancy status 504 of a corresponding virtual NIC 121 in the physical-victual NIC mapping list 303, and the after-policy-application processing scheme 1205 is set at the value of the physical NIC using scheme 506.

An NIC application change manager 904 refers to the command history-statistics information 901 and the virtual NIC list 302 to search the process switching policy 902 for a policy that meets conditions, and if a policy meeting the conditions exists in the process switching policy 902, executes a process according to the policy.

The system configuration management and control procedure of the hypervisor 11 of the first embodiment will be described below.

In order to specify the system configuration of the virtual computer 12, an example of the procedure of creating the virtual NIC list 302 and the physical-virtual NIC mapping list 303 will be described using the flow chart of FIG. 13. FIG. 13 is a flow chart showing the procedure of entering information about the configuration of the virtual computer 12.

In the following procedure, an administrator enters information about the configuration of the virtual computer 12 using a GUI or a command line.

First, the administrator specifies the predetermined number of virtual computers 12 (step 1301) and assigns each virtual computer 12 a virtual computer number 501 unique on the computer 10 and enters it. The virtual computer numbers 501 may be automatically assigned by the hypervisor 11 in the order in which virtual computers 12 are specified.

Next, the administrator specifies one or more virtual NICs 121 (functions) which each virtual computer 12 specified at step 1301 has (step 1302).

Then, it is checked whether the MAC addresses 401 and the device mounted positions 403 are to be automatically generated by the hypervisor 11 (step 1303).

If the hypervisor 11 automatically generates the MAC addresses 401 and the device mounted positions 403 (Yes at step 1303), the hypervisor 11 automatically generates their values, for example, in the order in which they are specified (step 1304).

If the hypervisor 11 does not automatically generate the MAC addresses 401 and the device mounted positions 403 (No at step 1303), the administrator enters their values using a user interface or the like (step 1305).

Then, it is checked whether the model names 402 are to be automatically generated by the hypervisor 11 (step 1306).

If the hypervisor 11 automatically generates the model names 402 (Yes at step 1306), the hypervisor 11 automatically generates the model names according to, e.g., a method which uses prescribed values (step 1307).

If the hypervisor 11 does not automatically generate the model names 402 (No at step 1306), the administrator enters a model name using a user interface or the like according to, e.g., a method in which the model name is selected from, a predetermined list (step 1308).

Then, it is checked whether the associations between physical NICs 101 and the virtual NICs 121 are to be automatically generated by the hypervisor 11 step 1309).

If the hypervisor 11 automatically associates physical NICs 101 with the virtual NICs 121 (Yes at step 1309), the physical NIC assigning unit 305 of the hypervisor 11 automatically assigns physical NICs 101 that meets predetermined conditions to the virtual NICs 121 respectively according to a method described later and sets items, i.e., generates associations (step 1310).

If the hypervisor 11 does not automatically associate physical NICs 101 with the virtual NICs 121 (No at step 1309), the administrator enters associations using a user interface or the like (step 1311).

If virtual NICs 121 are used in redundancy configuration on the virtual computer 12, the administrator enters the redundancy configuration 503 and the redundancy statuses 504 according to the redundancy configuration of the virtual NICs 121 on the virtual computer 12 (step 1312). This step 1312 does not need to be performed at the same time as the specifying of the virtual computer 12, but at any time the administrator may enter them using the user interface, or a program to obtain and transit the status of the redundancy configuration on the virtual computer 12 to the hypervisor 11 may be prepared, and after the start of the virtual computer 12, the program may be executed on the virtual computer 12 to enter them.

Items that are not entered in this input procedure are determined by the physical NIC assigning unit 305 according to a method described later.

In this way, the virtual NIC list 302 and the physical-virtual NIC mapping list 303 are created.

Figure 14:
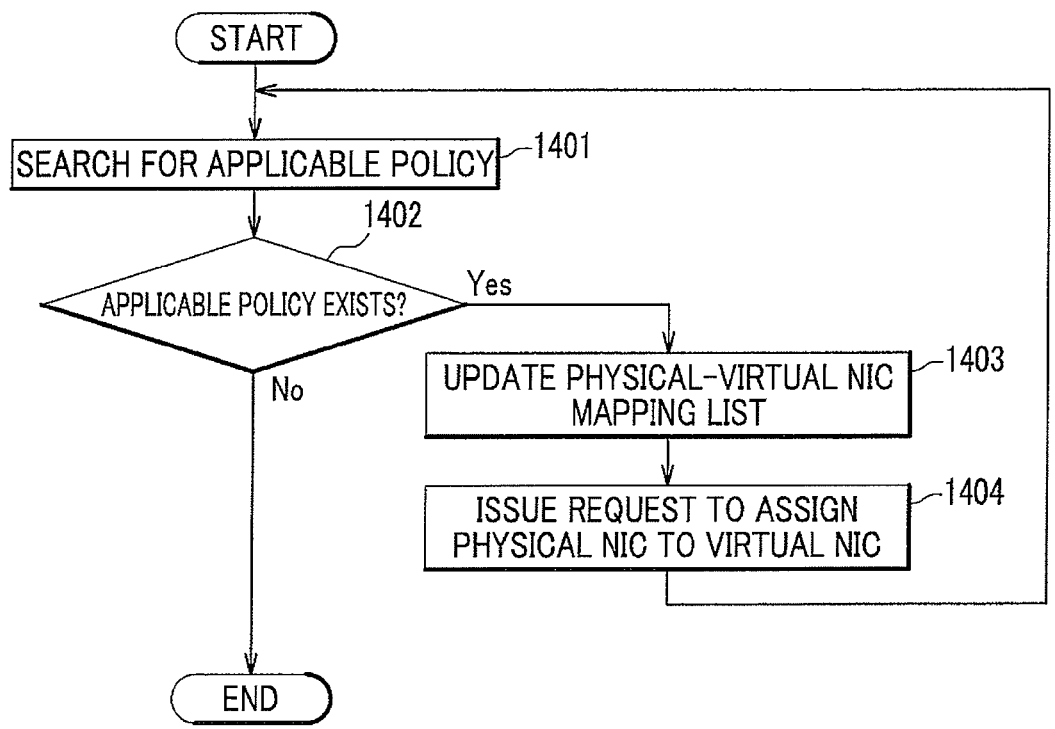
FIG. 14 is a flow chart showing the procedure of executing the process switching policy.

Next, the procedure of the NIC application change manager 904 of FIG. 9 executing the policy according to the process switching policy 902, and the like will be described using the flow chart of FIG. 14. FIG. 14 is a flow chart showing the procedure of executing the process switching policy.

The NIC application change manager 904 is associated with a specify virtual NIC 121, and time to execute this procedure can be when the command history-statistics unit 903 of the virtual NIC 121 has updated the command history information 901-1, or just before it clears the counter of the command statistics information 901-2, or at constant time intervals.

First, the NIC application change manager 904 refers to or searches the process switching policy 902 (step 1401) and, e.g., confirms or determines whether a condition described using FIG. 12 is met (whether an applicable policy exists).

If a policy whose condition is met does not exist (No at step 1402), the process ends.

If a policy whose condition is met exists (Yes at step 1402), the NIC application change manager 904 updates information of the physical-vial NIC mapping list 303 using information of the after-policy-application status 1204 and the after-policy-application processing scheme 1205 (step 1403). At this time, if the after-policy-application processing scheme 1205 differs from the one before the policy application, information of the physical NIC identifier 505 corresponding to the virtual NIC 121 is changed to null.

The virtual NIC status manager 114 transmits a request having the identifier (virtual computer number 501 and virtual NIC identifier 502) of the virtual NIC 121 corresponding to the NIC application change manager 904 as a parameter, to assign a physical NIC 101 to the virtual NIC 121 to the physical NIC assigning unit 305 of the physical NIC status manager 113 (step 1404).

Thereafter, having returned to step 1401, step 1401 and the subsequent steps are repeated.

In this way, the policy can be executed by the NIC application change manager 904, etc.

The NIC application change manager 904 may have a programming interface to accept an instruction to change the status from outside the hypervisor 11 and accept an instruction to change the status from outside via that interface. When accepting an instruction to change the status from outside, the after-policy-application status 1204 and the after-policy-application processing scheme 1205 of FIG. 12 are received as input parameters, and steps 1403 and 1404 are executed.

Figure 15:
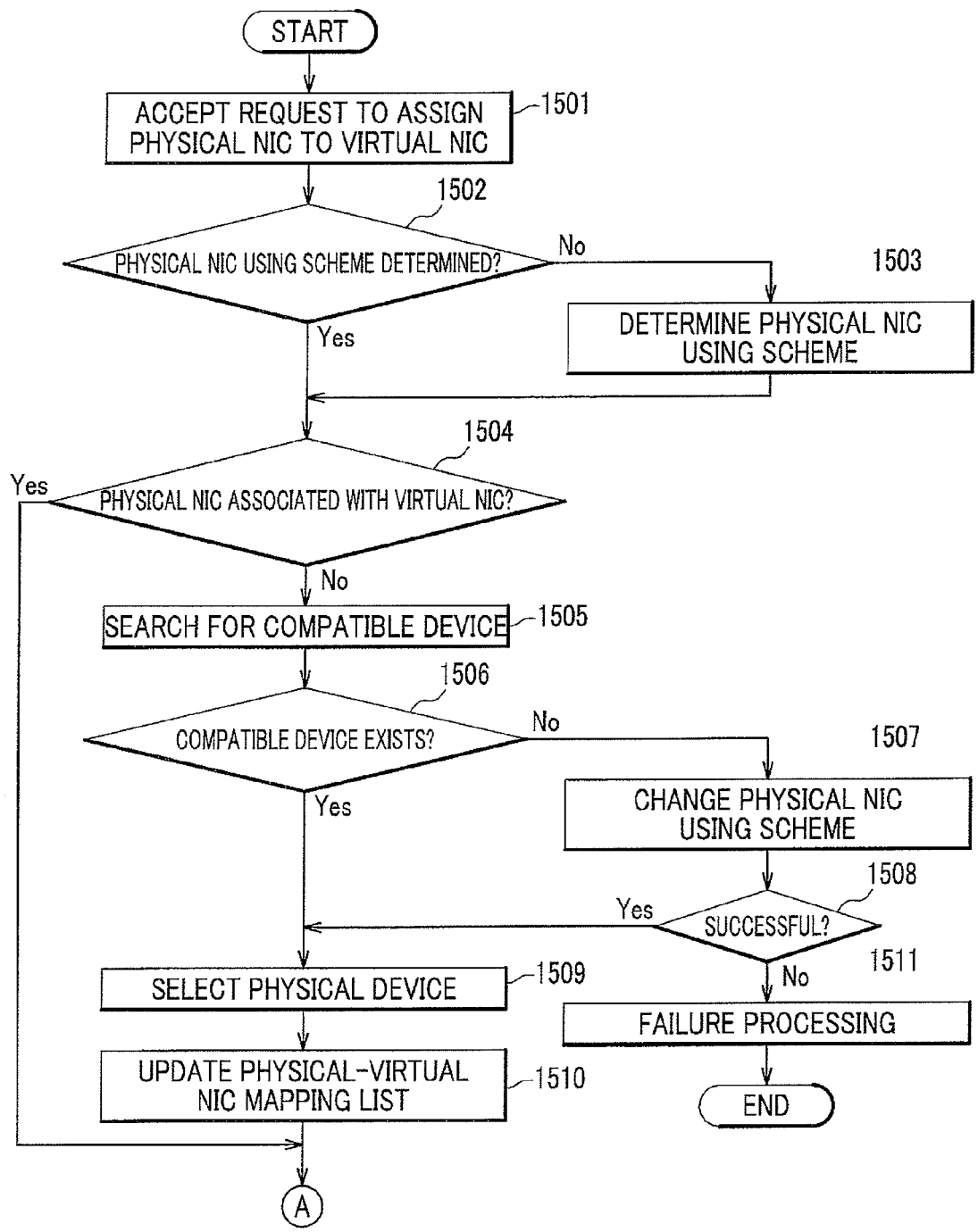
FIG. 15 is a flow chart showing the procedure of assigning a physical NIC.

Next, the method of the physical NIC assigning unit 305 of FIG. 3 to assign a physical NIC 101 to the virtual NIC 121 will be described using the flow chart of FIG. 15. FIG. 15 is a flow chart showing the procedure of the physical NIC assigning unit 305 to assign a physical NIC 101, etc.

When accepting a request to assign a physical NIC 101 to the virtual NIC 121 from another function such as the NIC application change manager 904, or at the start of the virtual computer 12, the physical NIC assigning unit 305 is made to operate by the hypervisor 11 (step 1501). That request needs an identifier uniquely identifying the virtual NIC 121 (the virtual computer numbers 501 and virtual NIC identifier 502) as an input parameter.

In the description below, the virtual NIC 121 uniquely identified by the input parameter is called a virtual NIC(A).

Next, the physical NIC assigning unit 305 refers to the physical-virtual NIC mapping list 303 and confirms whether the physical NIC using scheme 506 for the virtual NIC(A) has been determined (step 1502). If the physical NIC using scheme 506 is null (has not been determined) (No at step 1502), step 1503 is executed.

The physical NIC assigning it 305 executes steps 1401 to 1403 of FIG. 14, that is, updates or determines the physical NIC using scheme 506 (step 1503).

If the physical NIC using scheme 506 is not determined even after the execution of steps 1401 to 1403, an initial value determined at the implementation of the hypervisor 11 may be used in a dictating manner. In the present embodiment, description will be made assuming that its initial value indicates the use of the shared scheme.

Then, the physical NIC assigning unit 305 refers to the physical-virtual NIC mapping list 303 and confirms whether the physical NIC identifier 505 has been determined for (associated with) the virtual NIC(A) (step 1504). If the physical NIC identifier 505 is null, steps 1505 to 1510 are executed to determine the physical NIC identifier 505 for the virtual NIC (A).

To be specific, the physical NIC assigning unit 305, referring to the physical NIC list 301 and the physical-viral NIC mapping list 303, searches the list of physical devices (physical NICs 101) compatible with the virtual NIC(A) (step 1505) and determines whether a compatible physical device exists (step 1506).

Figure 16:
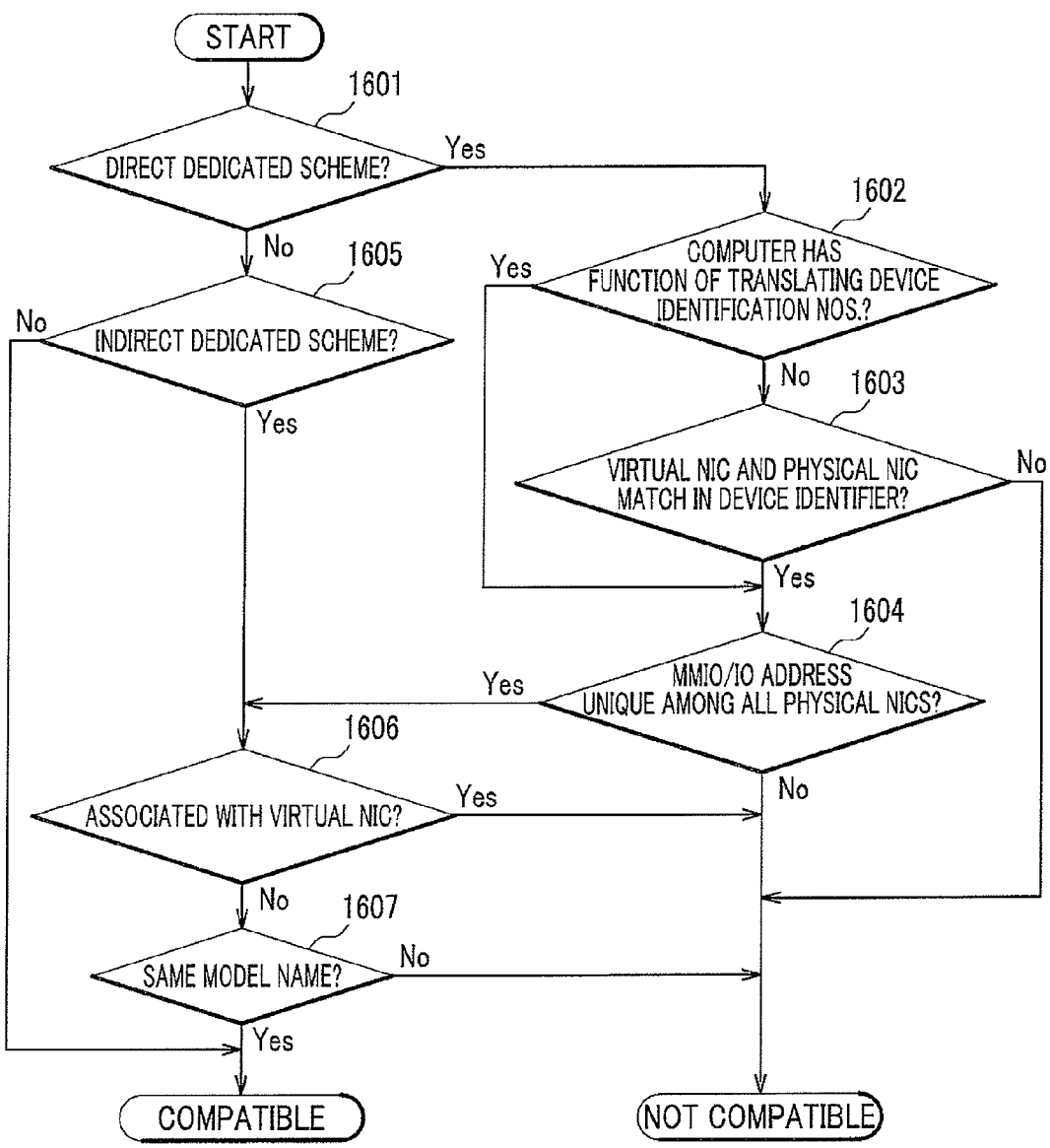
FIG. 16 is a flow chart showing the procedure of selecting a physical NIC compatible with a virtual NIC.

The method of confirming the compatibility varies depending on the physical NIC using scheme 506, the device mounted position 403, various address spaces in FIG. 7, and the like. The flow chart of an example method of confirming the compatibility is shown in FIG. 16. FIG. 16 is a flow chart showing the procedure of selecting a physical NIC compatible with a NIC. The operation in FIG. 16 is performed by the physical NIC assigning unit 305.

Hereinafter, a physical NIC 101 to be examined as to whether it is compatible with the virtual NIC(A) is called a physical NIC(B).

If the physical NIC using scheme 506 is the direct dedicated scheme (Yes at step 1601), in order to be determined to be compatible, it is necessary that the computer 10 do not have the function of translating device identification numbers (No at step 1602), that the virtual NIC(A) and the physical NIC(B) match in terms of the model name 402 and device mounted position 403 (device identifiers) (Yes at step 1603), and that the MMIO address 404 and IO address 405 of the virtual NIC(A) be unique among all physical NICs 101 (Yes at step 1604).

If the physical NIC using scheme 506 is the indirect dedicated scheme (No at step 1601 and Yes at step 1605), in order to be determined to be compatible, it is necessary that the physical NIC(B) be not associated with the virtual NIC(A) (No at step 1606), and that the virtual NIC(A) and the physical NIC(B) match in terms of the model name 402 (Yes at step 1607).

Also, after step 1604, the process proceeds through step 1606 and the subsequent steps.

Referring back to FIG. 15, if at step 1506 no compatible physical NIC 101, exists, the physical NIC using scheme 506 is changed (step 1507). If the change is successful (Yes at step 1508), step 1505 and the subsequent steps are repeated.

The physical NIC assigning unit 305 changes the physical NIC using scheme 506 of the virtual NIC(A) in the order predetermined by implementation. For example, in the order of the direct dedicated scheme, the indirect dedicated scheme, and the shared scheme, the value of the physical NIC using scheme 506 is changed. Although in the present embodiment the predetermined order is used, a table that specifies the change order may, be created beforehand on the hypervisor 11, and it may be changed in the order specified in the table.

If, having changed the physical NIC using scheme 506 a predetermined number, zero or greater, of times, a compatible device cannot be found (i.e., the change is not successful) (No at step 1508), then a process for the failure to assign a physical NIC 101 is performed (step 1511) and the process ends.

If more than one compatible physical NIC 101 has been found (Yes at step 1506), the physical NIC assigning unit 305 selects one physical NIC 101 (a physical device) according to a predetermined procedure (step 1509). An example of the selecting procedure is to select the physical NIC 101 that was found first.

Then, the physical NIC assigning unit 305 changes the value of the physical NIC identifier 505 for the virtual NIC(A) in the physical-virtual NIC mapping list 303 to the identifier of the physical NIC 101 selected at step 1509 (step 1510).

In this way, a physical NIC 101 can be assigned to the virtual NIC 121.

Figure 17:
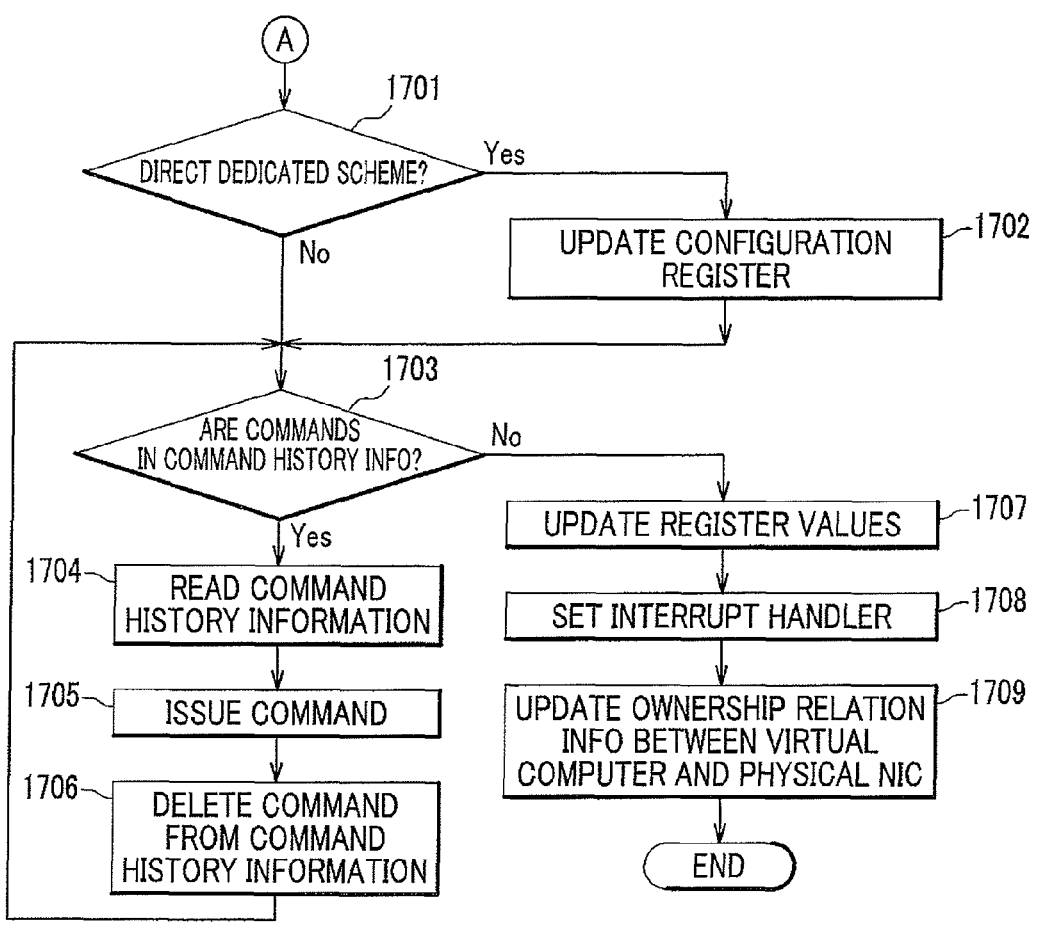
FIG. 17 is a flow chart of the procedure for initializing a physical NIC.

After the procedure of FIG. 15 finishes, the physical NIC assigning unit 305 performs a physical NIC initializing procedure on the physical NIC 101 assigned to the virtual NIC (A). An example of the procedure for initializing the physical NIC 101 will be described using the flow chart of FIG. 17. FIG. 17 is a flow chart of the procedure for initializing the physical NIC 101.

When performing the procedure for initializing the physical NIC 101, the physical NIC identifier 505 is necessary as an input parameter. Hereinafter, the physical NIC 101 identified by the physical NIC identifier 505 is called a physical NIC (B), and the virtual NIC associated with the physical NIC(B) is called the it NIC(A).

The physical NIC assigning unit 305 refers to the physical-virtual NIC mapping list 303 and obtains the physical NIC using scheme 506 for the physical NIC(B). When the physical NIC using scheme 506 is the direct dedicated scheme (Yes at step 1701), the assigning unit 305 searches for the PCI configuration register 703 (see FIG. 7) of the physical NIC(B) with the physical NIC identifier 505 as a search key value and updates (replaces) the values of the MMIO address and, address of the corresponding register with the values of those of the vial NIC(A) (step 1702).

The physical NIC assigning unit 305 refers to the command history information 901-1 for the virtual NIC(A) and confirms whether commands (command names 1002) in the command history information 901-1 are recorded (step 1703). If commands are recorded (Yes at step 1703), the earliest command (the command history information 901-1) is read (step 1704) and issued to the physical NIC(B) (step 1705).

The physical NIC assigning unit 305 deletes the command which was issued at step 1705 from the list of the command history information 901-1 (step 1706). The deleting method depends on the implementation. For example, if the command history information 901-1 is implemented in the form of a ring buffer, the deleting is performed by incrementing the pointer address of the ring buffer.

The physical NIC assigning unit 305 overwrites (updates) the values of various registers of the physical NIC(B) with the contents of the virtual register 812 for the virtual NIC(A) (step 1707).

Further, the physical NIC assigning unit 305 sets an interrupt handler (step 1708) and updates information (a specifying table, or the like; not shown) about an ownership relation between the virtual computer 12 and the physical NIC 101 in hardware of the computer 10 as needed (step 1709).

An example of the hardware information is domain information and cache information described in the specification of "Virtualization Technology for Directed I/O" released by Intel (registered trademark). The domain information is information indicating a correspondence between the physical NIC identifier 505 and the virtual computer number 501. The context cache information is information indicating a correspondence between the virtual NIC identifier 502 and the physical NIC identifier 505.

In this way, the physical NIC 101 can be initialized.

Next, the control procedure for the entire virtual computer system when dynamically changing the processing scheme for the virtual NIC 121 on the system of the example configuration shown in FIG. 6 will be described using FIGS. 18 and 19.

(First Example Operation)

As a first example operation, an example control procedure of, where a failure having occurred in an NIC of the active system on the virtual computer 12, operation has been passed from the active NIC to a standby NIC, changing the scheme for the physical NIC 101 from the shared scheme to the direct dedicated scheme will be described using the sequence of FIG. 18. FIG. 18 shows an example sequence of the operation of the hypervisor 11 when changing from the shared scheme to the direct dedicated scheme. In this example operation sequence, the process switching policy 902 of FIG. 12 is used as an example of the policy.

In normal times, the OS 13 of a virtual computer 12-1 issues a data transmit command to a physical NIC "a" recognized as a virtual NIC "A" (step 1801).

The virtual NIC "A" is assigned to the physical NIC "a" under the direct dedicated scheme, and the NIC control command to the virus NIC "A" is transferred to the physical NIC "a" directly, not via the hypervisor 11.

If a failure occurs in the physical NIC "a", the failure of the data transmit command from the OS 13 or the link down of the physical NIC "a", is detected, and the OS 13 switches the NIC used in data transmission to a virtual NIC "B" on the virtual computer 12-1 (step 1802).

Because the step 1802 is performed on the virtual computer 12-1, the hypervisor 11 cannot directly detect the occurrence of the switching.

The control command issued to the virtual NIC "B" is sent to the command history-statistics unit 903 of the virtual NIC "B". The command history-statistics unit 903 analyzes the data transmit command and updates the command history-statistics information 901 (a history-statistics process) (step 1803). Thereafter, the processing unit 115 of the virtual NIC "B" analyzes the command and emulates its function (execute the command) with a program under the shared scheme (step 1804).

Also after step 1804, the same process as step 1803 is performed (step 1804-2).

In response to the update of the command history-statistics information 901 or at constant time intervals, the NIC application change manager 904 confirms the policy according to the procedure described in FIG. 14 (step 1805).

When detecting that the number of transmit packets per unit time in the virtual NIC "B" of the standby system exceeds a predetermined value, the NIC application change manager 904 applies the policy and changes the redundancy status 504 and physical NIC using scheme 506 of the physical-virtual NIC mapping list 303 (step 1806).

The physical NIC assigning unit 305 checks the status of the processing unit 115 of the virtual NIC "B" (the processing unit 115 of the virtual NIC controller 111 for the virtual NIC "B"; the same applies hereinafter) (step 1807). The physical NIC assigning unit 305 waits until the virtual NIC "B" reads a new command or becomes idle with no command to be processed, at which time the assigning unit 305 instructs the processing unit 115 to stop executing commands. Thereafter, the processing unit 115 stops executing commands.

The physical NIC assigning unit 305 searches for a physical NIC compatible with the virtual NIC "B" according to the method of FIG. 15.

The device identification number (MAC address 401) of a physical NIC "b" matches that of the virtual NIC "B", and the MMIO address 404 of the virtual NIC "B" is unique among all physical NICs 101 on the computer 10. Hence, the physical NIC "b" is confirmed to be compatible (Yes at step 1506 of FIG. 15) and is selected and associated with the virtual NIC (step 1808).

Next, the physical NIC assigning unit 305 replaces the values of the MMIO, address 404, IO address 405, and register of the physical NIC "b" with those of the virtual NIC "B" according to the procedure described in FIG. 17 and re-executes a setting command recorded in the command history information 901-1 to initialize the physical NIC "b" (step 1809).

After the execution of step 1809, when it is time to read a command as described at step 1807, the processing unit of the virtual NIC "B" of the standby system issues (transfers) the read command to the physical NIC "b" (step 1810).

Because the physical NIC "b" has taken over various addresses of the virtual NIC "B", at step 1810 and later, commands are directly issued from the OS 13 on the virtual computer 12 to the physical NIC "b" and the resultant status is checked directly by the OS 13 (step 1811).

By the above procedure, assigning the physical NIC "b" to the virtual NIC "B" in a dedicated manner with the high speed implementing method of the direct dedicated scheme is achieved.

(Second Example Operation)

As a second example operation, an example control procedure of, where a failure having occurred in an NIC of the active system on the virtual computer 12, operation has been passed from the active NIC to a standby NIC, changing the scheme for the physical NIC 101 to the indirect dedicated scheme will be described using FIG. 19. FIG. 19 shows an example sequence of the operation of the hypervisor 11 when changing from the shared scheme to the indirect dedicated scheme.

Figure 18:
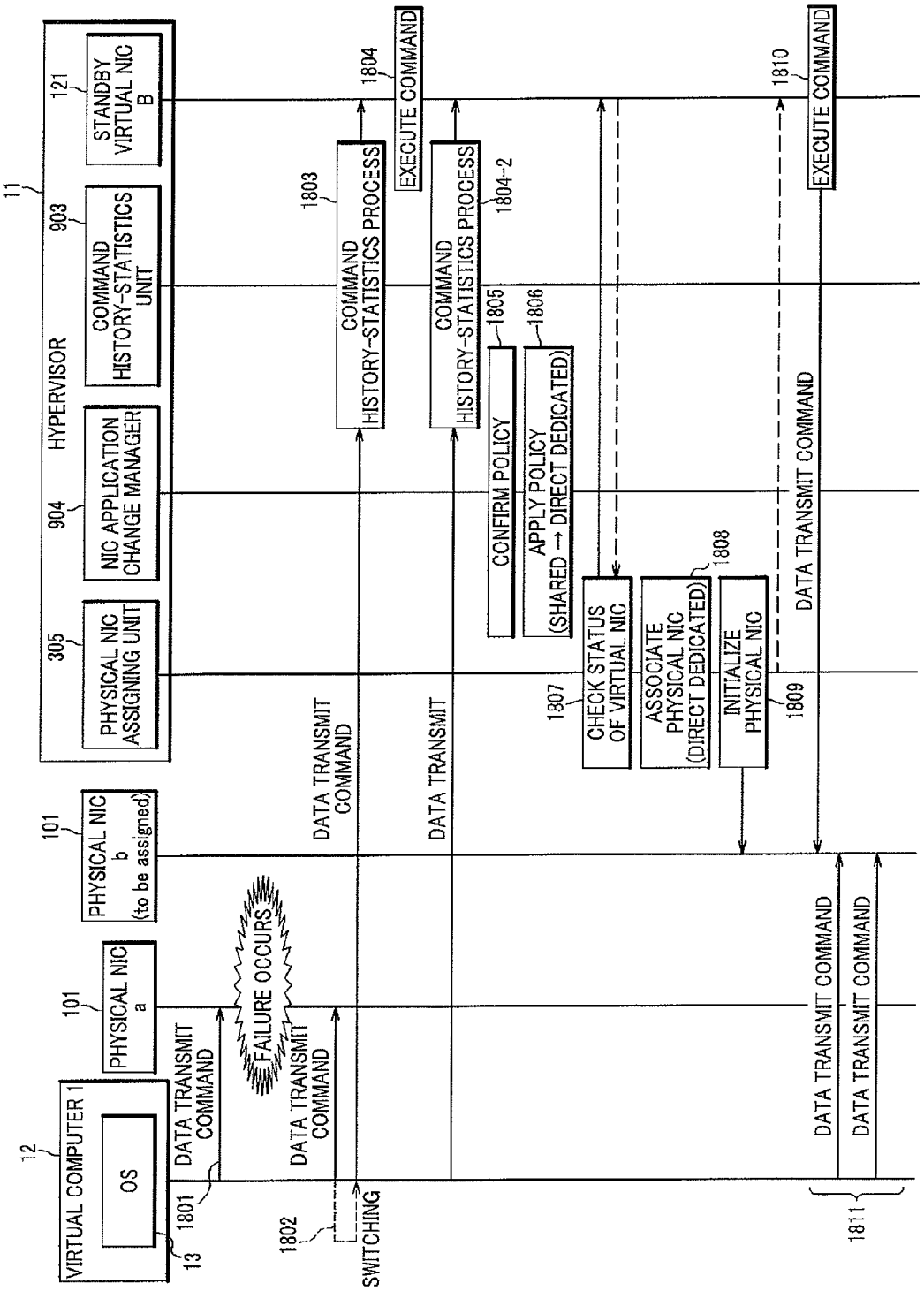
FIG. 18 shows an example sequence of the operation of a hypervisor when changing from a shared scheme to a direct dedicated scheme.
Figure 19:
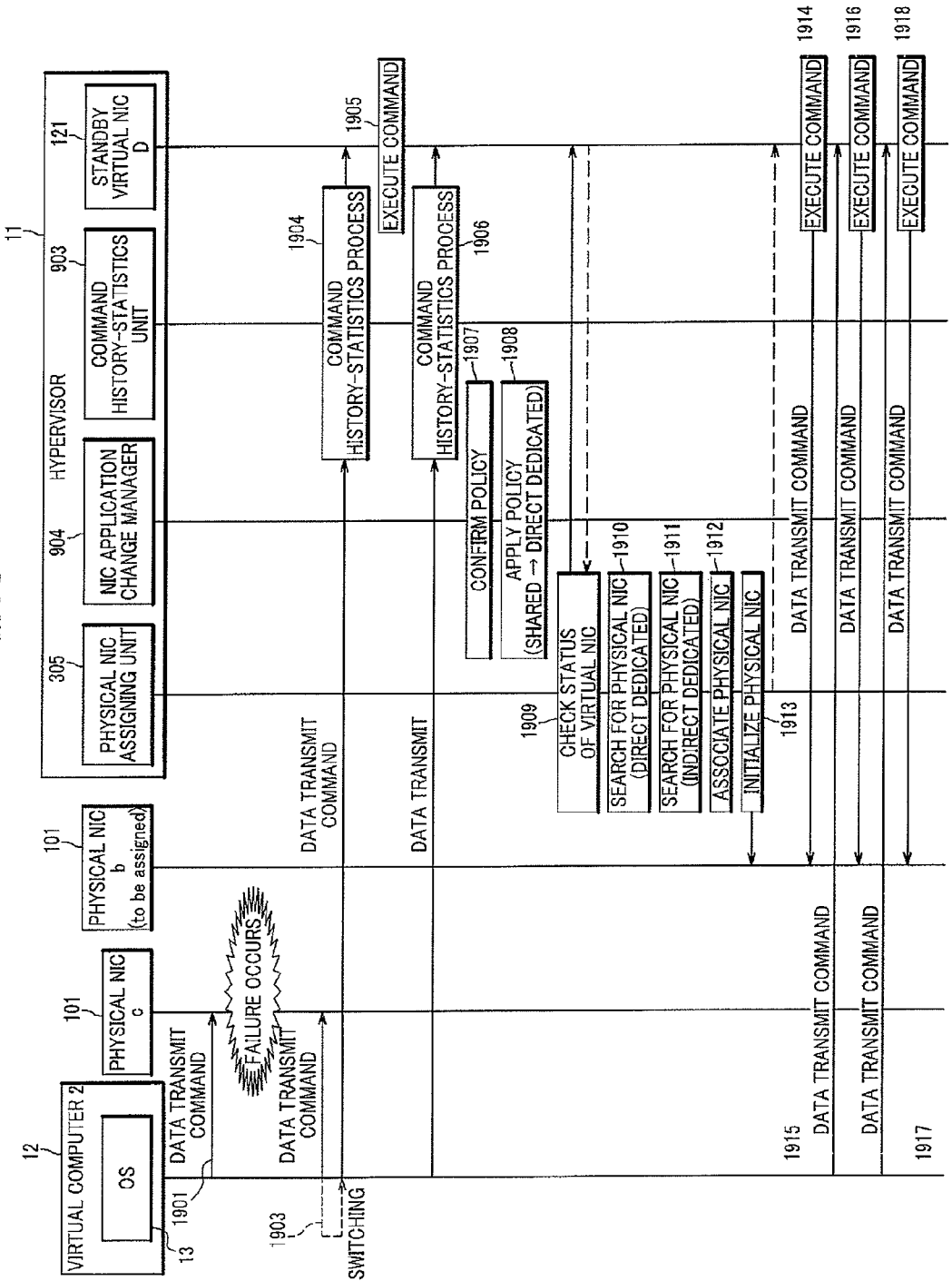
FIG. 19 shows an example sequence of the operation of the hypervisor when changing from the shared scheme to an indirect dedicated scheme.

The operation of FIG. 19 is the same in outline as that of FIG. 18 but different in the operation of the physical NIC assigning unit 305 and the subsequent processes. Since steps 1901 to 1909 of FIG. 19 are the same as steps 1801 to 1807 of FIG. 19, description will be omitted.

After step 1909, the physical NIC assigning unit 305 searches for a physical NIC compatible with the virtual NIC "D" according to the method of FIG. 15. However, the device identification number of the physical NIC "b" does not match that of the virtual NIC "D", so that it is not recognized as a compatible device (step 1910).

Then, the physical NIC assigning unit 305 executes the procedure of step 1507 in FIG. 15. In this example operation, the physical NIC using scheme 506 is changed from the direct dedicated scheme to the indirect dedicated scheme.

The physical NIC assigning unit 305 again searches for a compatible physical NIC that meets that condition. Since the physical NIC "b" is the same in model name as the virtual NIC "D", it is confirmed as a compatible device and selected as a device for the indirect dedicated scheme (step 1911).

Next, the physical NIC assigning unit 305 replaces the register values with the values of the virtual NIC "D" according to the procedure of FIG. 17 and re-executes a setting command recorded in the command history information 901-1 to initialize the physical NIC "b" (step 1913).

By this means, at step 1913 and later, data transmit commands (steps 1915, 1917) and the like to the NIC from the virtual computer 12-2 are once transferred to the processing unit of the virtual NIC "D", which replaces the device identifier and address according to the indirect dedicated scheme and issues (transfers) the identifier-replaced command to the physical NIC "b" (steps 1914, 1916, 1918).

As such, also in the case of a system configuration to which the direct dedicated scheme is not applicable, the processing scheme can be changed according to the above predetermined procedure such that a physical NIC 101 is assigned to a virtual NIC 121 in a dedicated manner.

As shown in the first and second example operation, by using the virtual computer system of the present embodiment, in the case where a plurality of virtual NICs 121 are being used as the standby system on the virtual computer 12, by the virtual NICs 121 sharing one physical NIC 101, the number of physical NICs 101 can be reduced. Further, the status of the virtual NIC 121 is managed according to the change in their usage, and the control is performed which, referring to the system configuration, assigns a physical NIC 101 to a virtual. NIC 121 in a dedicated manner according to a predetermined procedure, thus achieving control which selects a data transfer process with low overhead.

Second Embodiment

A second embodiment takes on the same system configuration as the first embodiment. With the configuration of the first embodiment, changes in process are as follows.

At the step 1505 of FIG. 15 performed by the physical NIC assigning unit 305, if a compatible device for the direct dedicated scheme does not exist and a compatible device for the indirect dedicated scheme is found, a notice of updating device information is transmitted to the OS 13 on the virtual computer 12 without performing the initializing process of FIG. 17.

For example, an existing method, the device Hot Plug, can be used for the update notice, and hence details will be omitted.

An example of the process for when the device mounted position 403 is different between the victual NIC 121 and the physical NIC 101 is to send a notice of adding a device with the device mounted position 403 of the physical NIC 101 specified and then a notice of deleting a device with the device mounted position 403 of the virtual NIC 121 specified.

Further, when the physical-virtual NIC mapping list 303 is updated at step 1510, various addresses and the device mounted position 403 of the virtual NIC 121 are updated to the values of the physical NIC 101.

The OS 13 on the virtual computer 12 re-initializes the device driver for the device specified in the notice.

By this means, the OS 13 on the virtual computer 12 is notified that the device mounted position 403 and various addresses such as MMIO address 404 of the virtual NIC 121 have been updated. Hence, the high speed direct transfer scheme, not the indirect dedicated scheme, can be used.

The embodiments have been described, but the present invention is not limited to these.

For example, the embodiments have been described taking an NIC as an example, but the present invention can also be applied to other devices such as a SCSI card.

Further, when changing the control scheme for a virtual device, the hypervisor may have the current use status of the virtual device displayed on the display (not shown) of the computer.

Yet further, for the control of virtual devices on a virtual computer, one or more other control schemes as well as the shared scheme and the dedicated scheme may be provided, and from the three or more control schemes, an appropriate one may be selected and switched to.

As to hardware, flow charts, and specific configurations, changes can be made thereof without departing from the scope of the present invention.

What is claimed is:

1. A computer in which functions of its resources including a processing unit and memory are divided to realize a plurality of virtual computers and which includes a plurality of physical devices that are peripheral connecting devices or network connecting devices, the computer comprising:

a managing unit that includes the processing unit and the memory, manages the plurality of virtual computers and the plurality of physical devices, assigns the virtual computers the physical devices so as to function as virtual devices, and manages the virtual devices according to one of a plurality of control schemes including a dedicated scheme where a virtual device is associated with a physical device on a one-to-one basis and a shared scheme where plural virtual devices are associated with one physical device, wherein the managing unit has:

status information holding use-status information indicating either an active status where the virtual device is in use or an inactive status where the virtual device is hardly or not at all in use;

configuration information holding information about configurations including respective address spaces of the physical devices and the virtual devices; and association information holding information about association between the physical devices and the virtual devices, and wherein the managing unit refers to the status information and, when determining that usage of the virtual device has changed from an active usage to a standby usage or from the standby usage to the active usage, referring to the configuration information and the association information, searches for a physical device compatible with a control scheme of the virtual device, determines whether or not there is a physical device compatible with the virtual device among the searched physical devices based on at least one of a hardware specification, an identifier, and an address space, and when there are one or more physical devices compatible with the virtual device,
  the managing unit selects one of the one or more physical devices compatible with the virtual device, and
  makes the one of the one or more physical devices compatible with the virtual device, be associated with the virtual device in the association information, and
when there is not any physical device compatible with the virtual device,
  the managing unit changes the control scheme of the virtual device stored in the association information to a differing control scheme of plural control schemes, as a changed control scheme, and
  when a physical device compatible with the changed control scheme of the virtual device is compatible with the virtual device, the managing unit makes the physical device compatible with the changed control scheme be associated with the virtual device in the association information; and
wherein there are two types of the dedicated scheme, including a direct dedicated scheme where commands issued from the virtual computer to the virtual device can be directly transmitted to the associated physical device, and an indirect dedicated scheme where the managing unit translates commands issued from the virtual computer to the virtual device in terms of address and transmits the translated commands to the associated physical device.

2. The computer according to claim 1, wherein the managing unit further has check-condition information holding a check condition of usage of the virtual device for checking whether the virtual device is in the active status or the inactive status of use and information about the control scheme that is applied when the virtual device meets the check condition,
  wherein referring to the status information and the check-condition information, the managing unit determines that usage of the virtual device has changed.

3. The computer according to claim 2, wherein the check condition is information about the type of a command that is issued from the virtual computer to the virtual device.

4. The computer according to claim 2, wherein the check condition is a threshold for use frequency of the virtual device.

5. The computer according to claim 1, wherein the managing unit stores settings of a newly selected virtual device, and initializes settings of the associated physical device according to the control scheme of the virtual device and copies the stored settings of the virtual device into the physical device.

6. The computer according to claim 1, wherein if, referring to the configuration information, determining that no physical device is compatible with the virtual device, the managing unit transmits a request to update settings of a device driver, which is control software for the virtual device, to an operating system on the virtual computer, thereby making the virtual computer implement the direct dedicated scheme.

7. The computer according to claim 1, wherein when changing the control scheme of the virtual device, the managing unit has the use status of the virtual device at least either before or after the change displayed on a display of the computer.

8. A control method for virtual devices by a computer in which functions of its resources including a processing unit and memory are divided to realize a plurality of virtual computers and which includes a plurality of physical devices that are peripheral connecting devices or network connecting devices, the computer including a managing unit that includes the processing unit and the memory:
the control method comprising:
the managing unit managing the plurality of virtual computers and the plurality of physical devices, assigning the virtual computers the physical devices so as to function as virtual devices, and managing the virtual devices according to one of a plurality of control schemes including a dedicated scheme where a virtual device is associated with a physical device on a one-to-one basis and a shared scheme where plural virtual devices are associated with one physical device,
wherein the managing unit has:
status information holding use-status information indicating either an active status where the virtual device is in use or an inactive status where the virtual device is hardly or not at all in use;
configuration information holding information about configurations including respective address spaces of the physical devices and the virtual devices; and
association information holding information about association between the physical devices and the virtual devices, and
wherein the control method further comprising the managing unit referring to the status information and, when determining that usage of the virtual device has changed from an active usage to a standby usage or from the standby usage to the active usage, referring to the configuration information and the association information, searches for a physical device compatible with a control scheme of the virtual device,
determines whether or not there is a physical device compatible with the virtual device among the searched physical devices based on at least one of a hardware specification, an identifier, and an address space, and
when there are one or more physical devices compatible with the virtual device,
  the managing unit selects one of the one or more physical devices compatible with the virtual device, and
  makes the one of the one or more physical devices compatible with the virtual device be associated with the virtual device in the association information, and
when there is not any physical device compatible with the virtual device,
  the managing unit changes the control scheme of the virtual device stored in the association information to a differing control scheme of plural control schemes, as a changed control scheme, and
  when a physical device compatible with the changed control scheme of the virtual device is compatible with the virtual device, the managing unit makes the physical device compatible with the changed control scheme be associated with the virtual device in the association information; and
wherein there are two types of the dedicated scheme including a direct dedicated scheme where commands issued from the virtual computer to the virtual device can be directly transmitted to the associated physical device, and an indirect dedicated scheme where the managing unit translates commands issued from the virtual computer to the virtual device in terms of address and transmits the translated commands to the associated physical device.

9. The control method for virtual devices according to claim 8, wherein the managing unit further has check-condition information holding a check condition of usage for checking whether the virtual device is in the active status or the inactive status of use and information about the control scheme that is applied when the virtual device meets the check condition, wherein if, referring to the check-condition information, determining that usage of the virtual device has changed, the managing unit, referring to the configuration information, selects a physical device compatible with the virtual device from the physical devices usable for a control scheme based on at least one of a hardware specification, an identifier, and an address space, and makes the physical device be associated with the virtual device in the association information and changes the control scheme of the virtual device.

10. The control method for virtual devices according to claim 9, wherein the check condition is information about the type of a command that is issued from the virtual computer to the virtual device.

11. The control method for virtual devices according to claim 9, wherein the check condition is a threshold for use frequency of the virtual device.

12. The control method for virtual devices according to claim 8, wherein the managing unit stores settings of a newly selected virtual device, and initializes settings of the associated physical device according to the control scheme of the virtual device and copies the stored settings of the virtual device into the physical device.

13. The control method for virtual devices according to claim 8, wherein if, referring to the configuration information, determining that no physical device is compatible with the virtual device, the managing unit transmits a request to update settings of a device driver, which is control software for the virtual device, to an operating system on the virtual computer, thereby making the virtual computer implement the direct dedicated scheme.

14. The control method for virtual devices according to claim 8, wherein when changing the control scheme of the virtual device, the managing unit has the use status of the virtual device at least either before or after the change displayed on a display of the computer.

* * * * *